(12) United States Patent
Adams et al.

(10) Patent No.: US 10,967,204 B1
(45) Date of Patent: Apr. 6, 2021

(54) SELF-CONTAINED NEGATIVE PRESSURE ENVIRONMENT DEVICE AND SYSTEM

(71) Applicant: SCONE Medical Solutions Inc., Scottsdale, AZ (US)

(72) Inventors: Michael Adams, Phoenix, AZ (US); Kristen Adams, Phoenix, AZ (US); Joseph V. Ranalletta, Greenville, SC (US); Gonghao Wang, Cary, NC (US)

(73) Assignee: SCONE MEDICAL SOLUTIONS INC., Scottsdale, AZ (US)

( * ) Notice: Subject to any disclaimer, the term of this patent is extended or adjusted under 35 U.S.C. 154(b) by 0 days.

(21) Appl. No.: 17/024,305

(22) Filed: Sep. 17, 2020

Related U.S. Application Data

(60) Provisional application No. 63/047,636, filed on Jul. 2, 2020.

(51) Int. Cl.
*A62B 7/10* (2006.01)
*A62B 23/02* (2006.01)
(Continued)

(52) U.S. Cl.
CPC ............. *A62B 7/10* (2013.01); *A62B 23/02* (2013.01); *B01D 46/10* (2013.01); *A61B 10/04* (2013.01); *A61G 10/005* (2013.01)

(58) Field of Classification Search
CPC .... A62B 7/00; A62B 7/02; A62B 7/04; A62B 7/06; A62B 7/08; A62B 7/10; A62B 7/12; A62B 11/00; A62B 13/00; A62B 15/00; A62B 23/00; A62B 23/02; A62B 23/025; A62B 23/04; A62B 31/00; A62B 17/04; A61G 10/00; A61G 10/005; A61G 10/02; A61G 1/04; A61G 3/008; A61G 10/04; A61G 10/023; B01D 46/10;
(Continued)

(56) References Cited

U.S. PATENT DOCUMENTS

| 2,191,024 A | * | 2/1940 | Matheny | ................ | A61G 10/04 135/92 |
| 2,366,904 A | * | 1/1945 | Haugh | ................... | A62B 17/04 128/206.24 |

(Continued)

FOREIGN PATENT DOCUMENTS

WO WO-2015022465 A1 * 2/2015 ............... A61G 1/04

OTHER PUBLICATIONS

FDA.Gov "Instruction for Healthcare Provider (HCP): Use of the Airway Dome", Retrieved from the Internet: https://www.fda.gov/media/140453/download (Year 2020).

*Primary Examiner* — Jan Christopher L Merene
*Assistant Examiner* — Brian T Khong
(74) *Attorney, Agent, or Firm* — Neo IP

(57) ABSTRACT

A system directed to providing a self-contained negative pressure environment (SCONE) to remove airborne particulates emitted from a patient. The system prevents exposure to pathogenic biological airborne particulates during triage, transportation, and treatment, including aerosol generating procedures (AGPs) and end of life care. This system is directed to a collapsible device having a flexible cover covering two support members, with openings in the flexible cover such that medical professionals can reach in and operate within. The present invention is further adaptable to patients and operating environments of various sizes.

28 Claims, 47 Drawing Sheets

(51) Int. Cl.
*A61G 10/00* (2006.01)
*A61G 10/04* (2006.01)
*B01D 46/10* (2006.01)
*A61B 10/04* (2006.01)

(58) Field of Classification Search
CPC .. A61M 16/0627; A61M 16/00; A61M 16/06; B08B 15/02; A47C 29/003; A47C 7/66; E04H 15/10; E04H 15/14
See application file for complete search history.

(56) References Cited

U.S. PATENT DOCUMENTS

| | | | | |
|---|---|---|---|---|
| 2,389,293 A * | 11/1945 | Blosser | ............... | A61G 10/04 128/205.26 |
| 2,681,659 A * | 6/1954 | Hrinsin | ............... | A47C 29/003 256/25 |
| 2,699,775 A * | 1/1955 | Cameto | ............... | A61G 10/04 128/205.26 |
| 2,840,093 A * | 6/1958 | Matthews | ............... | A61H 33/06 135/91 |
| 2,915,074 A * | 12/1959 | Cameto | ............... | E04H 15/20 52/2.21 |
| 3,000,379 A * | 9/1961 | Viers | ............... | A61G 10/04 128/204.16 |
| 3,306,289 A * | 2/1967 | Cameto | ............... | A61G 10/04 128/200.14 |
| 3,540,446 A * | 11/1970 | Dixon | ............... | A61G 10/04 128/205.26 |
| 3,763,507 A * | 10/1973 | Propst | ............... | A61G 7/00 5/100 |
| 3,798,685 A * | 3/1974 | Hunt | ............... | A61G 1/04 5/505.1 |
| 4,444,183 A * | 4/1984 | Heckendorn | ..... | A61M 16/0627 128/204.18 |
| 4,485,490 A * | 12/1984 | Akers | ............... | A41D 13/12 128/846 |
| 4,832,042 A * | 5/1989 | Poppendiek | ...... | A61M 16/0627 600/543 |
| 4,932,098 A * | 6/1990 | Haines | ............... | A47L 5/38 15/301 |
| 4,939,803 A * | 7/1990 | Waters | ............... | A47C 7/66 5/414 |
| 4,949,714 A * | 8/1990 | Orr | ............... | A61G 10/04 128/200.24 |
| 5,044,960 A * | 9/1991 | De Porteous | ............ | A63H 3/46 434/274 |
| 5,046,218 A * | 9/1991 | Cerri | ............... | A47L 9/06 15/416 |
| 5,210,888 A * | 5/1993 | Canfield | ............... | A47C 29/003 16/358 |
| 5,224,896 A * | 7/1993 | Terzian | ............... | A63H 11/18 446/268 |
| 5,242,112 A * | 9/1993 | Dunn | ............... | B05B 15/654 239/203 |
| 5,257,957 A | 11/1993 | Diccianni et al. | | |
| 5,511,259 A * | 4/1996 | Tarara | ............... | A47C 7/66 135/133 |
| 5,555,877 A * | 9/1996 | Lockwood | ............... | F24S 10/17 126/565 |
| 5,688,297 A * | 11/1997 | Spengler | ............ | B01D 46/0002 55/356 |
| 5,819,728 A | 10/1998 | Ritchie | | |
| 6,076,206 A * | 6/2000 | Celaya | ............... | A47C 29/003 135/119 |
| 6,076,524 A | 6/2000 | Corn | | |
| 6,123,091 A * | 9/2000 | Flynn | ............... | A47C 29/003 135/116 |
| 6,321,764 B1 | 11/2001 | Gauger et al. | | |
| 6,367,476 B1 * | 4/2002 | Conn | ............... | A61G 10/04 128/205.26 |
| 6,792,623 B2 | 9/2004 | Luppi | | |
| 6,971,985 B2 | 12/2005 | Perlatti | | |
| 7,677,245 B2 | 3/2010 | Borsari | | |
| 8,298,130 B2 | 10/2012 | Maloney | | |
| 2004/0177447 A1 * | 9/2004 | Love | ............... | A61G 10/005 5/658 |
| 2004/0255937 A1 * | 12/2004 | Sun | ............... | A61G 10/00 128/201.25 |
| 2005/0011006 A1 | 1/2005 | Ellen et al. | | |
| 2005/0136827 A1 | 6/2005 | Basset et al. | | |
| 2005/0241648 A1 * | 11/2005 | Dobbs | ............... | A61G 1/04 128/857 |
| 2006/0020159 A1 | 1/2006 | Ellen | | |
| 2006/137686 A1 | 6/2006 | Macris | | |
| 2011/0056489 A1 * | 3/2011 | Slaker | ............... | A62B 31/00 128/201.22 |
| 2012/0160239 A1 | 6/2012 | Hingley | | |
| 2012/0284916 A1 * | 11/2012 | Hill | ............... | A61G 1/04 5/414 |
| 2012/0285459 A1 | 11/2012 | Sata et al. | | |
| 2014/0090680 A1 * | 4/2014 | Reis | ............... | A61G 1/04 135/96 |
| 2016/0136024 A1 | 5/2016 | Poenisch et al. | | |
| 2016/0276048 A1 | 9/2016 | Popp et al. | | |
| 2016/0309916 A1 * | 10/2016 | Pothen | ............... | A47D 15/00 |
| 2017/0049238 A1 * | 2/2017 | Gilbert | ............... | A47C 7/666 |
| 2017/0145711 A1 * | 5/2017 | Esses | ............... | E04H 15/02 |
| 2018/0303691 A1 | 10/2018 | Heyerdahl et al. | | |
| 2020/0085660 A1 | 3/2020 | Jenkner | | |

* cited by examiner

136

100

100

SELF-CONTAINED NEGATIVE PRESSURE ENVIRONMENT DEVICE AND SYSTEM

CROSS REFERENCES TO RELATED APPLICATIONS

The present invention is related to and claims priority from U.S. Provisional Patent Application No. 63/047,636, filed Jul. 2, 2020, which is incorporated herein by reference in its entirety.

BACKGROUND OF THE INVENTION

1. Field of the Invention

The present invention relates to negative pressure environments and more specifically to particle filtration for an environment.

2. Description of the Prior Art

It is generally known in the prior art to provide air particle filtration.

Prior art patent documents include the following:

U.S. Pat. No. 5,819,728 for gas treatment hood by inventor Ritchie, filed Oct. 7, 1997 and issued Oct. 13, 1998, is directed to a hood assembly placeable over a person's head for treating a person with a gas such as oxygen. Basically the assembly includes a resilient neck ring around a user's neck, a soft, rubbery, tubular neck seal with one end connected to the neck ring and the other configured to fit around the user's neck and a transparent hood fastened to a hood ring that can be sealed against the neck ring. Tubes direct gas into and out the hood through ports through the neck ring. Preferably, the seal that engages the neck is marked with indicia showing a series of varying circumferences, so that the neck seal opening can be trimmed to provide a comfortable and sealing circumference for engaging the user's neck. The assembly is particularly adapted for use in providing oxygen to a patient in a hyperbaric chamber.

U.S. Pat. No. 6,792,623 for helmet for artificial respiration without the aid of masks by inventor Luppi, filed Dec. 12, 2002 and issued Sep. 21, 2004, is directed to a helmet for artificial respiration without the aid of masks, comprising a containment body with at least one optically transparent portion, which can accommodate hermetically the head of a patient. The containment body has an air intake port that can be connected to a ventilation apparatus and an outlet port. The helmet further comprises, on the containment body, substantially at the mouth of the patient being treated, an opening that can be closed removably by a closure element.

U.S. Pat. No. 7,677,245 for helmet for artificial respiration by inventor Borsari, filed May 14, 2003 and issued Mar. 16, 2010, is directed to a helmet for artificial respiration without the aid of tracheal tubes comprises a container body, having at least a transparent portion and in which a patient's head can be housed, and a collar for air-tight application to the patient's neck, which consists of at least a rigid ring, equipped with a series of gas administration connection and accessory-holder fittings, said rigid ring being the only part of the helmet connected to the outside when operating, wherein an opening is present on the container body for rapid access to the patient, which is substantially hermetically closed by rapid coupling elements.

U.S. Pat. No. 6,076,524 for anesthetic scavenging hood by inventor Corn, filed Jun. 23, 1994 and issued Jun. 20, 2000, is directed to an anesthesia scavenging hood and is adapted to fit over the head of a surgical patient to prevent the contamination of operating rooms with waste anesthetic vapor and nitrous oxide gas. The hood enables placement of an endotracheal tube or other breathing or anesthesia circuit into the patient's airway. The hood may be sealed about the endotracheal tube and about the patient. The hood also includes a port having disposed therein a suction tube which communicates waste vapor and gas out of the hood and outside of the operating room with the aid of a vacuum source.

US Patent Publication No. 2012/0160239 for breath apparatus by inventor Hingley, filed Aug. 31, 2010 and published Jun. 28, 2012, is directed to breathing apparatus including a hood enclosing the patient's head and having a gas inlet and outlet located on the hood in the region of the patient's nose and mouth. Inlet tubing connects the gas inlet on the hood with an outlet of a gas supply unit; outlet tubing connects the gas outlet on the hood with an inlet of the gas supply unit. A pump in the gas supply unit draws gas extracted from the outlet tubing through a scrubber to remove carbon dioxide from gas extracted from the enclosure. A mixer valve mixes gas from the scrubber with fresh gas from an oxygen and helium cylinder for supply back to the inlet tubing.

U.S. Pat. No. 6,321,764 for collapsible isolation apparatus by inventor Gauger et al., filed Aug. 24, 1999 and issued Nov. 27, 2001, is directed to a collapsible personnel isolation apparatus for preventing unwanted contaminations of hazardous biological and chemical materials including a base. A cover connects to the base by way of a zipper. A plurality of glove box ports are provided to allow rapid and convenient treatment of the patient.

U.S. Pat. No. 8,298,130 for contamination detainment unit by inventor Maloney, filed Oct. 4, 2007 and issued Oct. 30, 2012, is directed to a mobile isolation unit which forms a chemical and biological barrier that has a substantially rectangular-parallelepiped shaped enclosure and a frame system configured to support the enclosure in the suspended position so as to create and internal and external environment. The enclosure may also be equipped with at least one opening for access into and out of the enclosure, a zipper for opening and closing the access port, at least one biomedical port, and a plurality of support points configured to support the enclosed in the suspended position when the frame is in an open position so that a patient can be placed in and out of the enclosure. A method for isolating and treating a patient using the mobile isolation unit is also provided.

U.S. Pat. No. 6,971,985 for an isolation chamber by inventor Perlatti, filed Jun. 2, 2003 and issued Dec. 6, 2005, is directed to an isolation chamber for providing containment for a contaminated patient including a flexible enclosure that is configurable to receive a contaminated patient therein. The enclosure includes a first side, a second side, a top that is hingedly pivotable about a top of the first side, a bottom, a first end, and a second end. The top is maintained spaced apart from the bottom such that the top is maintained out of physical contact with a contaminated patient received in the enclosure. A plurality of attachment devices are disposed on at least one of the first and second sides or the first and second ends. The plurality of attachment devices are configured to attach to one of the first and second sides or the first and second ends to support members of a stretcher. If desired, ventilation may be provided within the isolation chamber.

US Patent Publication No. 2006/0137686 for a normobaric infection control by inventor Macris, filed Dec. 19, 2005 and published Jun. 29, 2006, is directed to a normobaric infection control apparatus and method utilizing a portable, inflatable oxygen treatment type hood having an inlet port to which an inhalation gas conduit is connected and an outlet port to which an exhaled gas conduit is connected, and in which, in a first structural embodiment and method, provides normobaric infection control of a user's exhalations by means of exhaled gas filter means disposed in the exhaled gas conduit, and which, in a second structural embodiment and method, provides normobaric infection control of the inhalations of a user by means of inhalation gas filter means disposed in the inhalation gas conduit.

US Patent Publication No. 2016/0136024 for a method & device for containing deadly germs of a patient during treatment by inventor Poenisch, et al., filed Nov. 18, 2014 and published May 19, 2016, is directed to methods and devices presented for the long-term treatment of a patient infectious with deadly microbes without a risk for spread of germs to caregivers comprising a hermetically sealed human sized containment box with means for delivering medical care, for sustaining life, and for dealing with waste products, as well as providing rehabilitative care.

US Patent Publication No. 2018/0303691 for a patient isolator by inventor Heyerdahl et al., filed Nov. 14, 2016 and published Oct. 25, 2018, is directed to a patient isolator including a base and a cover which is arranged to seal with the base. The cover is formed from a rigid material and has two access ports on an end face. The two access ports are angled in a width direction relative to a plane which extends parallel to the width direction of the patient isolator. The two access ports are angled relative to each other. A method of isolating a patient from an environment is also disclosed.

US Patent Publication No. 2020/0085660 for marine rescue patient isolation apparatus by inventor Jenker, filed Mar. 15, 2018 and published Mar. 19, 2020, is directed to a patient isolation unit (PIU) for use in marine rescues. The PIU of this invention is useful to safely transport personnel exposed to, or potentially exposed to, an identified and/or known infectious agent or chemical warfare agent (CWA) on marine vessels and/or aircraft such as Coast Guard boasts, cutters and aircraft. The PIU has a generally tapered tubular shape compatible with wire rescue baskets conforming in shape to the human body and into which an injured, sick, or disabled person can be safely strapped, such as the Stokes litter rescue basket for hoisting and fit in rotary wing aircraft.

U.S. Pat. No. 5,257,957 for facility for providing a sealed work area to handle, manipulate and formulate materials by inventor Diccianni et al., filed Oct. 16, 1992 and issued Nov. 2, 1993, is directed to a facility for providing a sealed work area to handle, manipulate and formulate materials which includes a walled enclosure having an interior periphery defining a work area. The enclosure includes an inlet port for allowing air to flow into the enclosure work area and an outlet port for allowing air to flow out of the enclosure work area. A replaceable liner is positioned within the enclosure work area in facing relationship with the interior periphery to further define the enclosure work area. The liner includes an inlet aperture in complementary sealed engagement with the inlet port and an outlet aperture in complementary sealed engagement with the outlet port. The liner is readily removable from the work area to be replaced with a second liner to facilitate decontamination of the work area. A blower causes air to flow through the inlet port into the enclosure work area and out of the enclosure work area through the outlet port.

US Patent Publication No. 2005/0136827 for a mobile aeraulic isolation device against airborne contamination with variable geometry air diffuser by inventor Basset et al., filed Oct. 19, 2002 and issued May 15, 2007, is directed to a mobile aeraulic isolation device with variable geometry multi-block air diffusion chamber, comprising at least two mobile plenums to protect a sensitive area such as a bed against contaminating airborne aerosols. It comprises an air diffusion chamber formed of at least two rigid plenums mechanically connected together so as to be mobile relative to one another, and having a lower air diffusing surface substantially planar and porous to air. Relative movement means for mobile plenums enable their positioning in relation to one another in at least two distinct relative positions. The device comprises physical decontamination means for moving air passing through it, air pressurising means, aeraulic connection and air circulation means, and a mobile supporting chassis. The device a) is characteristic in that it comprises complementary means for absolute movement of the group of two rigid plenums relative to chassis. So that its two plenums are both mobile, both relative to one another and relative to chassis. Device a) forms a mobile protective isolation device for immunosuppressed persons.

US Patent Publication No. 2005/0011006 for restraining enclosure for a bed and related method by inventor Ellen et al., filed Aug. 3, 2004 and issued Jun. 3, 2008, is directed to a collapsible enclosure for restraining a patient to an area about a bed comprising a frame having a horizontal eave portion, a horizontal base portion opposing the horizontal cave portion, and at least two vertical members upstanding from the horizontal base portion for supporting the horizontal cave portion. The frame collapses as an integral unit for storage and transfer. A canopy secured to the frame defines an area about a bed such that a patient is allowed to move freely within the area. The canopy includes see-through portions defined by dark colored mesh to enhance visibility therethrough and prevent glare. In one embodiment, the canopy includes a hermetically sealable chamber defining the patient area for quarantining the patient therein.

US Patent Publication No. 2006/0020159 for portable isolation enclosure by inventor Ellen et al., filed Aug. 2, 2005 and issued Jan. 20, 2009, is directed to an isolation enclosure is provided for isolating a person to an area about a bed, wherein the bed is adapted to support the person and includes a frame and a mattress overlying the frame. The isolation enclosure comprises a frame adapted to surround the bed; and a canopy connectable to the frame and defining an isolation chamber sealed with respect to the ambient atmosphere. The isolation chamber extends over the frame of the bed and is sufficiently large to allow a person located within the isolation chamber to be supported on the bed and to move freely within the isolation chamber. The canopy includes a base wall adapted to either (i) overly the mattress of the bed, and (ii) lie between the mattress and the frame of the bed. A frame transport device, such as wheels, casters, or sliders, is mounted on the frame and adapted to transport the frame and canopy in cooperation with the bed to thereby transport a patient supported on the bed and located within the isolation chamber. An environmental control device is connectable in fluid communication with the isolation chamber and includes (i) a filter adapted to filter air entering and filter air exiting the isolation chamber, and (ii) a pump adapted to pump air into the isolation chamber to increase the pressure within the isolation chamber relative to the ambient atmosphere, and pump air out of the isolation chamber to decrease the pressure within the isolation chamber relative to the ambient atmosphere.

US Patent Publication No. 2012/0285459 for air disinfection and cleaning device, and exhaled gas disinfection and cleaning device, interior air disinfection and cleaning device, and simplified isolation device using the same by inventor Sata et al., filed Jan. 14, 2011 and published Nov. 15, 2012, is directed to an air disinfection and cleaning device is provided that includes: a cylindrical reflector having a cylindrical inner surface in which an air flows from an upper end to a lower end and the cylindrical inner surface is subjected to mirror finishing; a rod shaped ultraviolet lamp disposed at the center within the cylindrical reflector parallel to the long side; photocatalytic sheet filters being air permeable photocatalytic sheet filters having a diameter nearly equal to an inner diameter of the cylindrical reflector, provided respectively at one end and the other end in the cylindrical reflector, and being penetrated by the ultraviolet lamp at the center thereof; and a copper sheet filter being an air permeable photocatalytic sheet filter having a diameter nearly equal to an inner diameter of a cylinder member and closing a lower end opening of the cylindrical reflector.

US Patent Publication No. 2016/0276048 for device system for military and/or humanitarian operations, in particular a mobile decontamination system by inventor Popp et al., filed Jun. 2, 2016 and issued Jan. 1, 2019, is directed to a device system for military and/or humanitarian operations, in particular a mobile decontamination system, comprises a plurality of power-operated units, accessory parts and operating supplies, which together determine a functional scope of the device system. The power-operated units, accessory parts and operating supplies are mounted on a base plate by means of a retaining structure, said base plate having a defined placement surface and anchoring elements. The anchoring elements enable detachable anchoring of the base plate together with the retaining structure to a transport means, in particular to a transport vehicle. The retaining structure is formed from a plurality of self-supporting, structurally identical, cuboid-shaped frames, which are arranged next to each other and/or on top of each other and are fastened to the base plate. The frames each have eight corner pieces and twelve edge profile elements, which together enclose a defined storage volume. The power-operated units, accessory parts and operating supplies are arranged in the defined storage volumes and, preferably, at least the majority of the power-operated units and operating supplies are retained in the frames even during operation of the device system.

SUMMARY OF THE INVENTION

The present invention relates to removing airborne particulates emitted from a patient during triage, transportation, and treatment, including aerosol generating procedures (AGPs) and end of life care.

It is an object of this invention to prevent exposure to pathogenic biological airborne particulates during triage, transportation, and treatment, including aerosol generating procedures (AGPs) and end of life care.

It is another object of this invention to provide a device that is compatible with a standard hospital bed and average human size and to provide adequate space to allow healthcare personnel to perform a medical procedure.

In one embodiment, the present invention includes a device for removing airborne particulates from an environment, comprising: a multiplicity of support members, at least two locking hinges, a flexible cover including at least one slit, at least one port operable to connect to an air supply or a vacuum, and at least one crossbar, wherein at least two support members of the multiplicity of support members are substantially parallel, wherein each of the at least two locking hinges is configured to connect at least two of the multiplicity of support members, wherein the at least one crossbar is configured to connect the at least two substantially parallel support members, wherein the flexible cover covers the multiplicity of support members, and wherein the at least one slit provides access to the interior of the device.

In another embodiment, the present invention includes a device for removing airborne particulates from an environment, comprising: a multiplicity of support members, at least two locking hinges, a flexible cover including at least one slit, at least one port operable to connect to an air supply or a vacuum, at least one crossbar, and at least one tube including a first end and a second end, wherein each of the at least two locking hinges is configured to connect at least two support members of the multiplicity of support members, wherein at least two support members of the multiplicity of support members are substantially parallel, wherein the at least one crossbar is configured to connect the at least two substantially parallel support members, wherein the flexible cover covers the multiplicity of support members, wherein the slit provides access to the interior of the device, wherein the first end of the at least one tube is connected to the at least one port, and wherein the second end of the at least one tube is connected to the air supply or the vacuum.

In yet another embodiment, the present invention includes a device for removing airborne particulates from an environment, comprising: a multiplicity of support members, at least two locking hinges, a flexible cover including at least one slit, at least one port operable to connect to an air supply or a vacuum, at least one crossbar, and at least one barb fitting, wherein at least two support members of the multiplicity of support members are substantially parallel, wherein each of the at least two locking hinges is configured to connect at least two of the multiplicity of support members, wherein the at least one crossbar is configured to connect the at least two substantially parallel support members, wherein the at least one barb fitting is configured to connect at least two support members of the multiplicity of support members, wherein the flexible cover covers the multiplicity of support members; wherein the at least one slit provides access to the interior of the device, wherein the device is configured to be positioned in an open position and a closed position, and wherein, in the open position, at least two of the multiplicity of support members are substantially orthogonal.

In still another embodiment, the present invention includes a device for removing airborne particulates from an environment, comprising: a multiplicity of support members, at least two locking hinges, a flexible cover including at least one slit, at least one port operable to connect to an air supply or a vacuum, at least one crossbar, at least one barb fitting, a base, and an attachment component, wherein at least two support members of the multiplicity of support members are substantially parallel, wherein each of the at least two locking hinges are configured to connect at least two of the multiplicity of support members, wherein the at least one crossbar is configured to connect the at least two substantially parallel support members, wherein the at least one barb fitting is configured to connect at least two support members of the multiplicity of support members, wherein the flexible cover covers the multiplicity of support members, wherein the at least one slit provides access to the interior of the device, wherein the base includes a first base support member, a second base support member, and a base crossbar, wherein the first base support member and the second base support member are substantially parallel, and wherein the base crossbar is configured to connect the first base support member and the second base support member, and wherein the attachment component is operable to attach the device to a hospital bed or a stretcher.

These and other aspects of the present invention will become apparent to those skilled in the art after a reading of the following description of the preferred embodiment when considered with the drawings, as they support the claimed invention.

DETAILED DESCRIPTION

Figure 1:
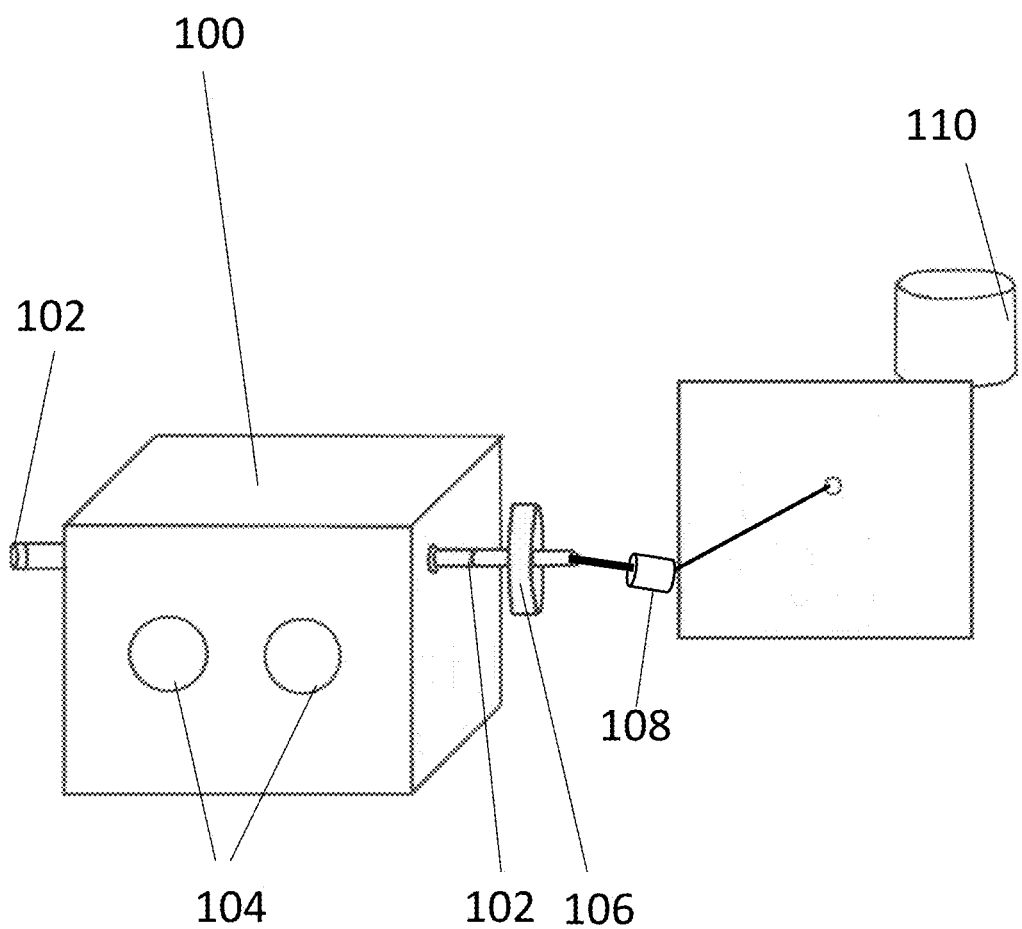
FIG. 1 illustrates an air particulate filtration system according to one embodiment of the present invention.

The present invention is generally directed to preventing exposure to pathogenic biological airborne particulates.

In one embodiment, the present invention includes a device for removing airborne particulates from an environment, comprising: a multiplicity of support members, at least two locking hinges, a flexible cover including at least one slit, at least one port operable to connect to an air supply or a vacuum, and at least one crossbar, wherein at least two support members of the multiplicity of support members are substantially parallel, wherein each of the at least two locking hinges is configured to connect at least two of the multiplicity of support members, wherein the at least one crossbar is configured to connect the at least two substantially parallel support members, wherein the flexible cover covers the multiplicity of support members, and wherein the at least one slit provides access to the interior of the device. The device further includes wherein the multiplicity of support members include a brace, wherein the brace includes a first brace crossbar, a second brace crossbar, a first pair of substantially parallel support members and a second pair of substantially parallel support members, wherein the first brace crossbar is configured to connect each support member of the first set of substantially parallel support members, and wherein the second brace crossbar is configured to connect each support member of the second set of substantially parallel support members. The brace further includes the at least two locking hinges, wherein each of the at least two locking hinges is configured to connect to a support member of the first set of substantially parallel support members and a support member of the second set of substantially parallel support members. The device further including a base, wherein the base includes a first base support member, a second base support member, and a base crossbar, wherein the first base support member and the second base support member are substantially parallel, and wherein the base crossbar is configured to connect the first base support member and the second base support member. The device is configured to be positioned in an open position and a closed position, wherein, in the open position, at least two of the multiplicity of support members are substantially orthogonal, wherein the at least two substantially orthogonal support members are connected via at least one barb fitting. The flexible cover includes polyvinyl carbonate. The at least one slit includes four slits. The device further includes a base and at least one attachment component, wherein the base includes a base crossbar, wherein the at least one attachment component is connected to the base crossbar, wherein the at least one attachment component is operable to attach the device to a hospital bed or a stretcher. The at least one port includes two ports. The device further includes at least one cover attachment component, wherein the at least one cover attachment component includes at least one female snap fastener, wherein the at least one female snap fastener is operable to receive a male snap fastener, and wherein the flexible cover includes the male snap fastener.

In another embodiment, the present invention includes a device for removing airborne particulates from an environment, comprising: a multiplicity of support members, at least two locking hinges, a flexible cover including at least one slit, at least one port operable to connect to an air supply or a vacuum, at least one crossbar, and at least one tube including a first end and a second end, wherein each of the at least two locking hinges is configured to connect at least two support members of the multiplicity of support members, wherein at least two support members of the multiplicity of support members are substantially parallel, wherein the at least one crossbar is configured to connect the at least two substantially parallel support members, wherein the flexible cover covers the multiplicity of support members, wherein the slit provides access to the interior of the device, wherein the first end of the at least one tube is connected to the at least one port, and wherein the second end of the at least one tube is connected to the air supply or the vacuum. The device further includes wherein the multiplicity of support members include a brace, wherein the brace includes a first brace crossbar, a second brace crossbar, a first pair of substantially parallel support members and a second pair of substantially parallel support members, wherein the first brace crossbar is configured to connect each support member of the first set of substantially parallel support members, wherein the second brace crossbar is configured to connect each support member of the second set of substantially parallel support members. The brace further includes the at least two locking hinges, wherein each of the at least two locking hinges is configured to connect to a support member of the first set of substantially parallel support members and a support member of the second set of substantially parallel support members. The device further including a base, wherein the base includes a first base support member, a second base support member, and a base crossbar, wherein the first base support member and the second base support member are substantially parallel, wherein the base crossbar is configured to connect the first base support member and the second base support member. The device is further configured to be positioned in an open position and a closed position, wherein, in the open position, at least two of the multiplicity of support members are substantially orthogonal, wherein the at least two substantially orthogonal support members are connected via at least one barb fitting. The device further including at least one High Efficiency Particulate Air (HEPA) filter connected to the at least one port. The device wherein the at least one slit includes four slits. The device wherein the flexible cover includes polyvinyl carbonate. The device further including a base and at least one attachment component, wherein the base includes a base crossbar, wherein the at least one attachment component is attached to the base crossbar, and wherein the at least one attachment component is operable to attach the device to a hospital bed or a stretcher. The device wherein the at least one port includes two ports. The device further including at least one cover attachment component, wherein the at least one cover attachment component includes at least one female snap fastener, wherein the at least one female snap fastener is operable to receive a male snap fastener, wherein the flexible cover includes the male snap fastener.

In yet another embodiment, the present invention includes a device for removing airborne particulates from an environment, comprising: a multiplicity of support members, at least two locking hinges, a flexible cover including at least one slit, at least one port operable to connect to an air supply or a vacuum, at least one crossbar, and at least one barb fitting, wherein at least two support members of the multiplicity of support members are substantially parallel, wherein each of the at least two locking hinges is configured to connect at least two of the multiplicity of support members, wherein the at least one crossbar is configured to connect the at least two substantially parallel support members, wherein the at least one barb fitting is configured to connect at least two support members of the multiplicity of support members, wherein the flexible cover covers the multiplicity of support members; wherein the at least one slit provides access to the interior of the device, wherein the device is configured to be positioned in an open position and a closed position, and wherein, in the open position, at least two of the multiplicity of support members are substantially orthogonal. The device further including a base and at least one attachment component, wherein the base includes a base crossbar, wherein the at least one attachment component is attached to the base crossbar, and wherein the at least one attachment component is operable to attach the device to a hospital bed or a stretcher. The device further including at least one cover attachment component, wherein the at least one cover attachment component includes at least one female snap fastener, wherein the at least one female snap fastener is operable to receive a male snap fastener, wherein the flexible cover includes the male snap fastener. The device wherein the at least two substantially orthogonal support members are connected via the at least one barb fitting.

In still another embodiment, the present invention includes a device for removing airborne particulates from an environment, comprising: a multiplicity of support members, at least two locking hinges, a flexible cover including at least one slit, at least one port operable to connect to an air supply or a vacuum, at least one crossbar, at least one barb fitting, a base, and an attachment component, wherein at least two support members of the multiplicity of support members are substantially parallel, wherein each of the at least two locking hinges are configured to connect at least two of the multiplicity of support members, wherein the at least one crossbar is configured to connect the at least two substantially parallel support members, wherein the at least one barb fitting is configured to connect at least two support members of the multiplicity of support members, wherein the flexible cover covers the multiplicity of support members, wherein the at least one slit provides access to the interior of the device, wherein the base includes a first base support member, a second base support member, and a base crossbar, wherein the first base support member and the second base support member are substantially parallel, and wherein the base crossbar is configured to connect the first base support member and the second base support member, and wherein the attachment component is operable to attach the device to a hospital bed or a stretcher. The device wherein the multiplicity of support members include a brace, wherein the brace includes a first brace crossbar, a second brace crossbar, a first pair of substantially parallel support members and a second pair of substantially parallel support members, wherein the first brace crossbar is configured to connect each member of the first set of substantially parallel support members, and wherein the second brace crossbar is configured to connect each support member of the second set of substantially parallel support members. The device wherein the at least one slit includes four slits. The device further including at least one cover attachment component, wherein the at least one cover attachment component includes at least one female snap fastener, wherein the at least one female snap fastener is operable to receive a male snap fastener, wherein the flexible cover includes a male snap fastener. The device is configured to be positioned in an open position and a closed position, wherein, in the open position, at least two of the multiplicity of support members are substantially orthogonal, wherein the at least two substantially orthogonal support members are connected via the at least one barb fitting.

None of the prior art discloses an adjustable negative pressure environment system that reduces the difficulty of operating on a patient without increasing the exposure to pathogenic airborne particles.

The present invention is directed towards a self-contained negative pressure environment (SCONE) device. In one embodiment, the SCONE device includes a standalone clear polycarbonate box with arm access holes, a drape holder, at least one arm hole cover and tubing connector/adapter(s). The intubation device is operable to mount on a bed to cover a patient's neck and head when the patient is lying in a supine position. The SCONE device includes an air supply and a vacuum suction tube to generate a negative pressure environment for the patient. Advantageously, the SCONE device acts as an extra layer of protection in addition to personal protective equipment (PPE) to prevent healthcare personnel (HCP) exposure to pathogenic biological airborne particulates during triage, transportation, and treatment, including aerosol generating procedures (AGPs) and end of life care. For example and not limitation, the present invention is operable to block COVID-19 particulates and similarly sized particulates. The present invention is further operable to capture and remove airborne particulates from a patient's nose and mouth by creating a negative pressure environment that provides both barrier and aerosolization protection.

It is an object of the present invention to reduce the spread of infectious disease in hospitals, decrease illness and missed workdays for healthcare professionals and reduce the need for costly personal protective equipment. Additionally, the present invention enables a hospital to increase its triage throughput, particular during periods of high capacity (e.g., during a pandemic). The present invention increases triage throughput by providing an adaptable device for patients and hospital beds of different sizes. Furthermore, the present invention prevents exposure to airborne pathogenic particulates for hospital visitors, and increases a patient's morale and emotional comfort.

The present invention is further directed towards ambulatory uses. In one embodiment, the present invention is configured for quick deployment during emergency situations.

In one embodiment, the present invention includes a device that is operable to support a variety of medical procedures. The device includes a box, at least one drape, a drape holder strip, a tether for the drape holder strip, magnetic tape for the drape holder strip, at least one magnet, at least one cap plug, at least one safety line, at least one pipe adapter, at least one breathing circuit, at least one step-down adapter, tubing, and at least one tube connector. In another embodiment, the box includes a clear polycarbonate material. In one embodiment, the box is 5-sided. The box includes at least one arm access hole to provide access to a patient. The box further includes at least one air management port to provide for the inflow and outflow of air. The at least one cap plug is operable to support a ⅛ inch plastic safety line. The present invention further includes at least one cap plug for a hand hole cover and at least one cap plug for a suction line. In another embodiment, the present invention includes ½ inch socket-connect female×½ inch NPT male PVC pipe adapter and an ½ inch socket-connect female×½ inch NPT female PVC pipe adapter. The present invention further includes a Universal F2 anesthesia breathing circuit. In yet another embodiment, the present invention includes a polyvinyl chloride (PVC) film cover.

In one embodiment, the present invention includes a step down adapter between a breathing tube and a hospital line. In another embodiment, the outer ring of the step-down adapter is 1 and ⅜ inches. The hole opening has a larger end diameter of ⅞ inches. In another embodiment the step-down adapter includes a hole opening diameter of 13/16 inches with an external diameter of 1⅜ inches. In yet another embodiment, the step-down adapter includes a soft plumbing hose rubber material.

In another embodiment, the present invention includes a drape. The present invention includes at least one drape holder strip, a tether for the drape holder strip, magnetic tape for the drape holder strip, and at least one magnet. In one embodiment, the magnet is a neodymium magnet.

Referring now to the drawings in general, the illustrations are for the purpose of describing one or more preferred embodiments of the invention and are not intended to limit the invention thereto.

FIG. 1 illustrates a system according to one embodiment of the present invention. The system includes a SCONE device 100. The SCONE device 100 includes at least one vacuum line 102, at least one air/oxygen supply, and arm holes 104. The system further includes a High Efficiency Particulate Air (HEPA) filter 106, a step down adapter 108, and an air suction system 110. In one embodiment, the walls, top, and bottom of the SCONE device are constructed out of a clear material, such as polycarbonate. Alternatively, a translucent material is utilized for the walls, top and/or bottom of the SCONE device. The HEPA air filter 106 captures airborne particulates. The air suction system 110 is configured to supply negative air retrieval draw that supports negative pressure inside the SCONE device 100. The system further includes a drape over the patient and a magnetic strip attachment to hang the drape on the rear of the SCONE device 100. In one embodiment, at least one arm hole cover is utilized to cover the arm holes 104. In another embodiment, the arm hole covers are constructed out of plastic or vinyl. Additionally and/or alternatively, the arm hole covers include one or more openings so that the interior of the SCONE device is accessible to a medical professional.

Figure 2:
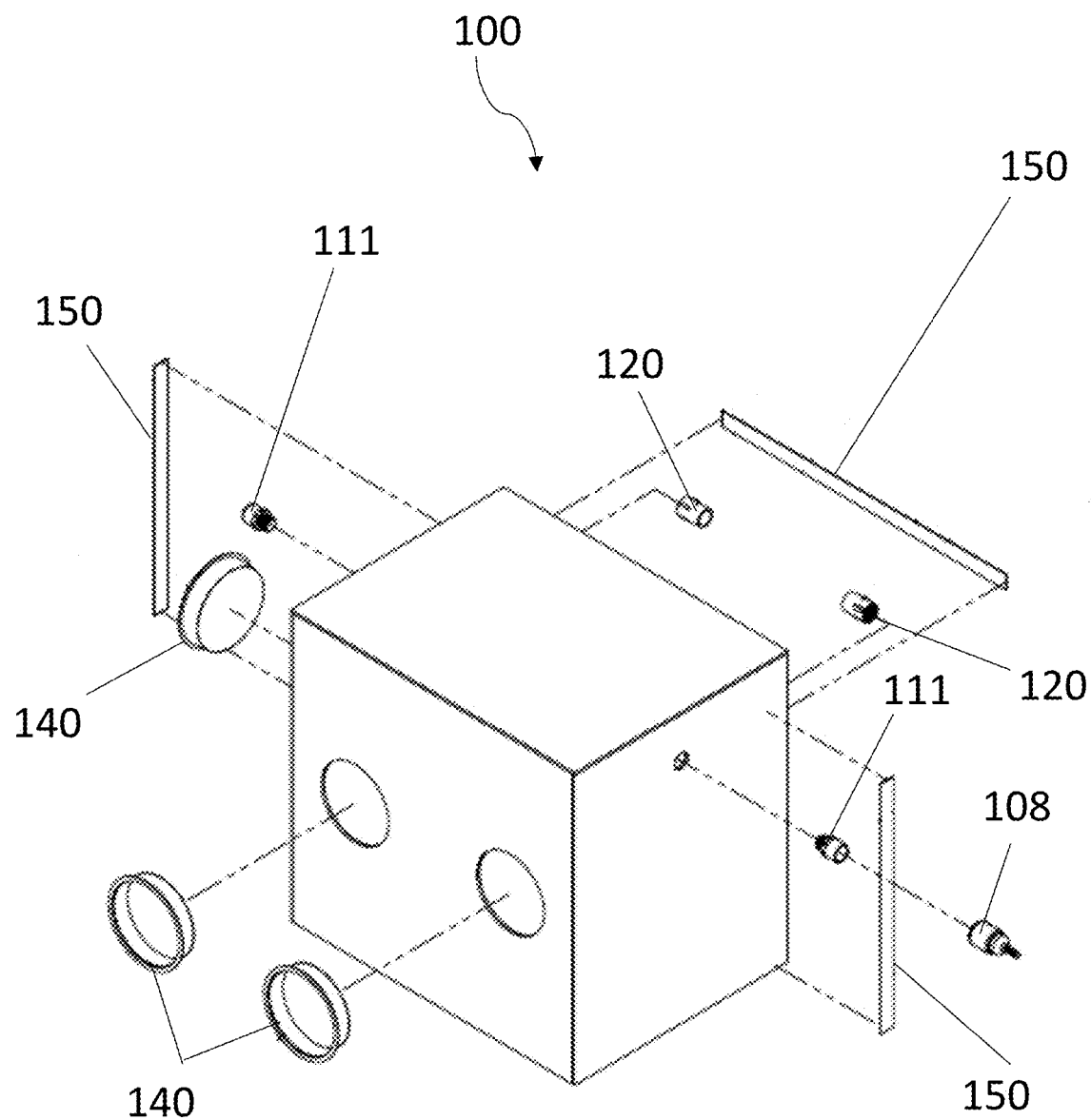
FIG. 2 illustrates an exploded view of a SCONE device according to one embodiment of the present invention.
Figure 3:
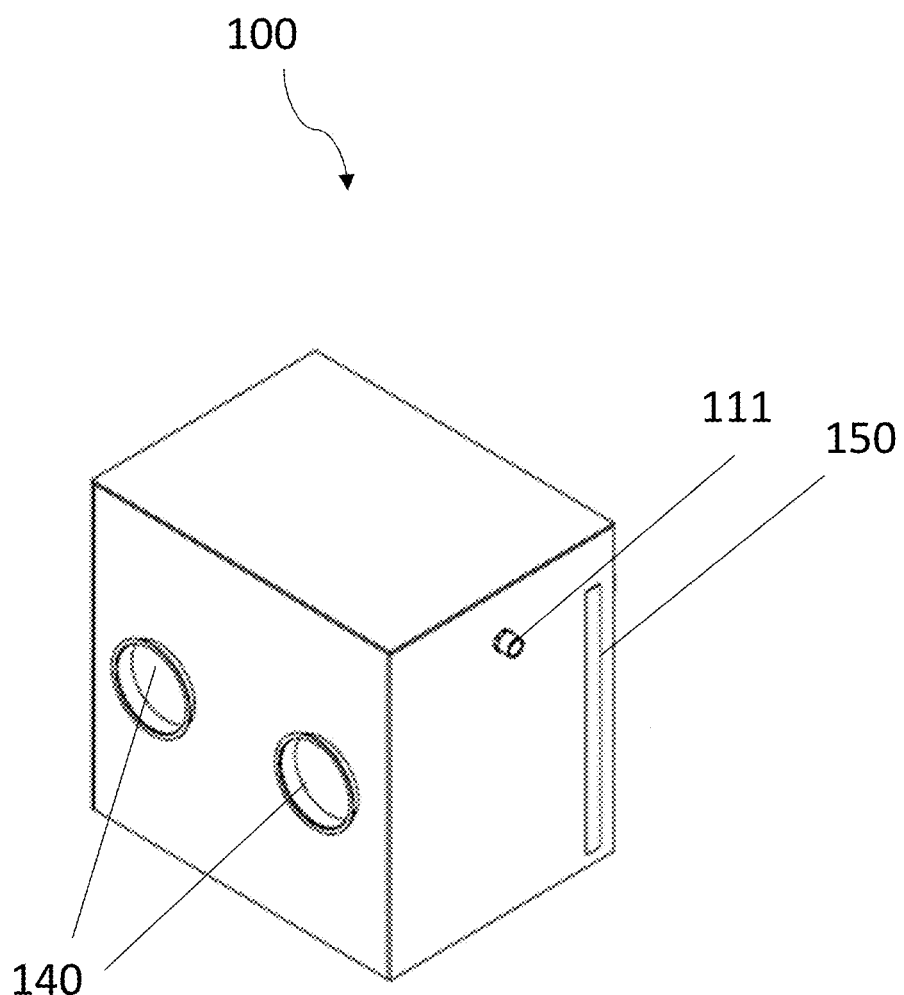
FIG. 3 illustrates a side perspective view of an assembled version of the SCONE device of FIG. 2.

FIG. 2 illustrates an exploded view of a SCONE device according to one embodiment of the present invention. The SCONE device 100 includes ½ inch socket-connect female×½ inch NPT male PVC pipe adapters 111, ½ inch socket-connect female×½ inch NPT female PVC pipe adapters 120, a step-down adapter 108, tapered plugs 140, and magnetic tape 150. The SCONE device 100 includes two openings positioned on opposite sides of the SCONE device 100 to receive the ½ inch socket-connect female×½ inch NPT male PVC pipe adapters 111. The step-down adapter 108 is operable to connect and control airflow between a breathing hose and a suction system. The tapered plugs 140 are operable to be received by three openings in the SCONE device 100, with two of the three openings being positioned on the same side of the SCONE device 100 and the third opening being positioned on an adjacent side of the SCONE device 100. The tapered plugs 140 fit in the openings to maintain the negative pressure environment when the patient is not undergoing a medical procedure. The magnetic tape 150 includes an adhesive side and is operable to hold a drape. FIG. 3 illustrates a side perspective view of the SCONE device of FIG. 2.

Figure 4:
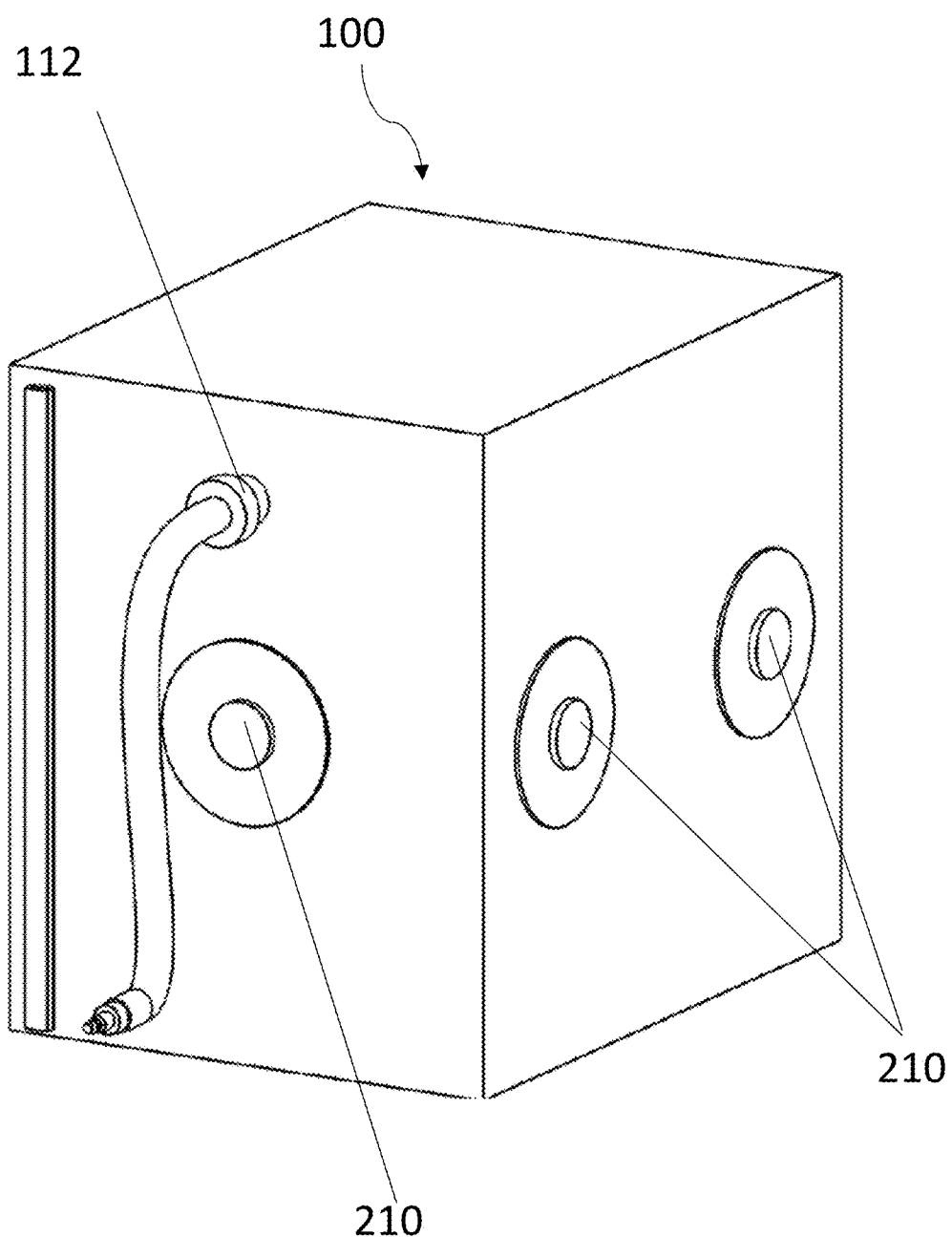
FIG. 4 illustrates a side perspective view of a SCONE device according to one embodiment of the present invention.
Figure 5:
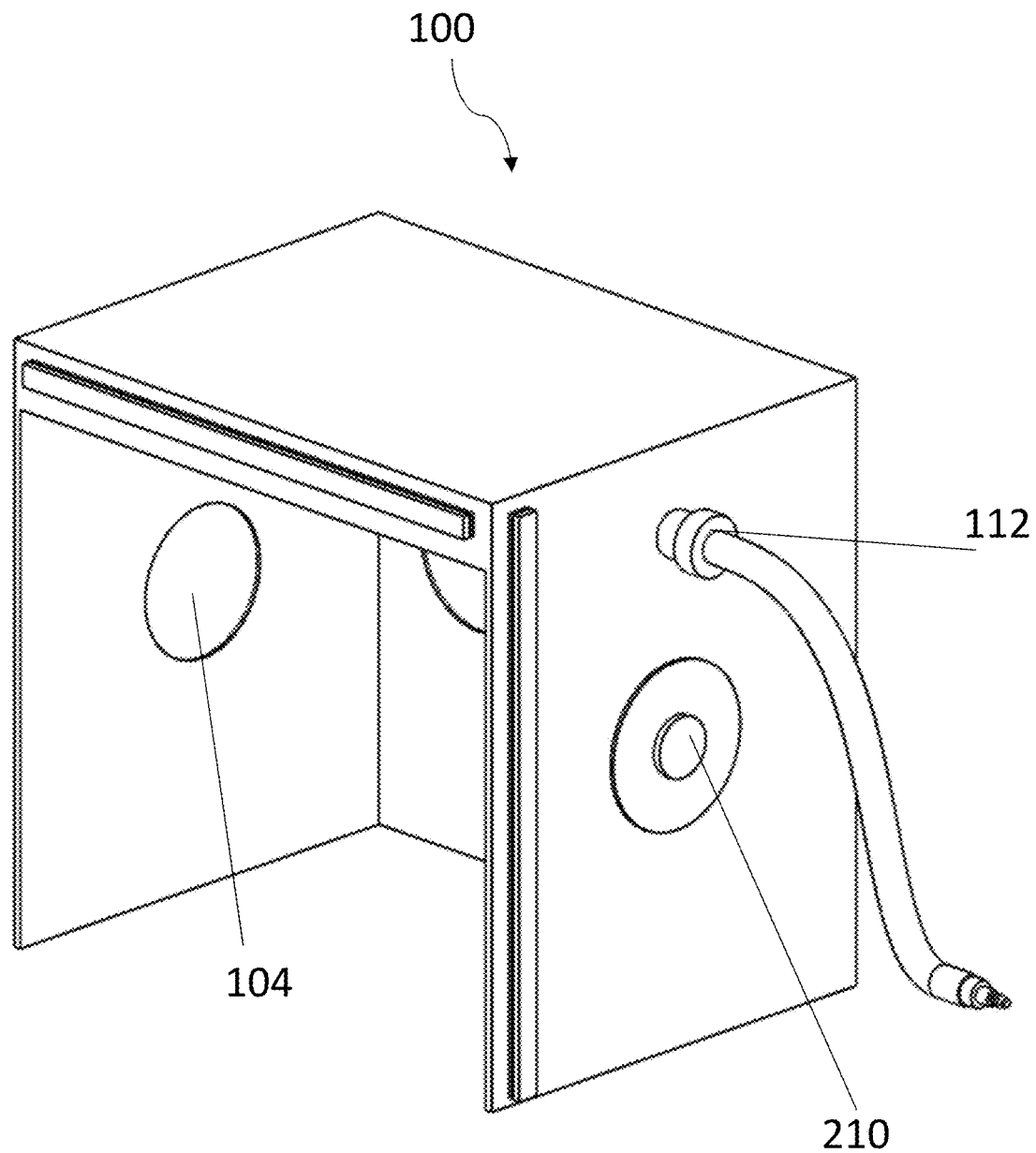
FIG. 5 illustrates a front perspective view of a SCONE device according to one embodiment of the present invention.

FIG. 4 illustrates a rear perspective of a SCONE device according to one embodiment of the present invention. In one embodiment, the SCONE device 100 includes at least one arm hole cover 210 and at least one vacuum port 112. FIG. 5 illustrates a front perspective of a SCONE device according to one embodiment of the present invention.

Figure 6:
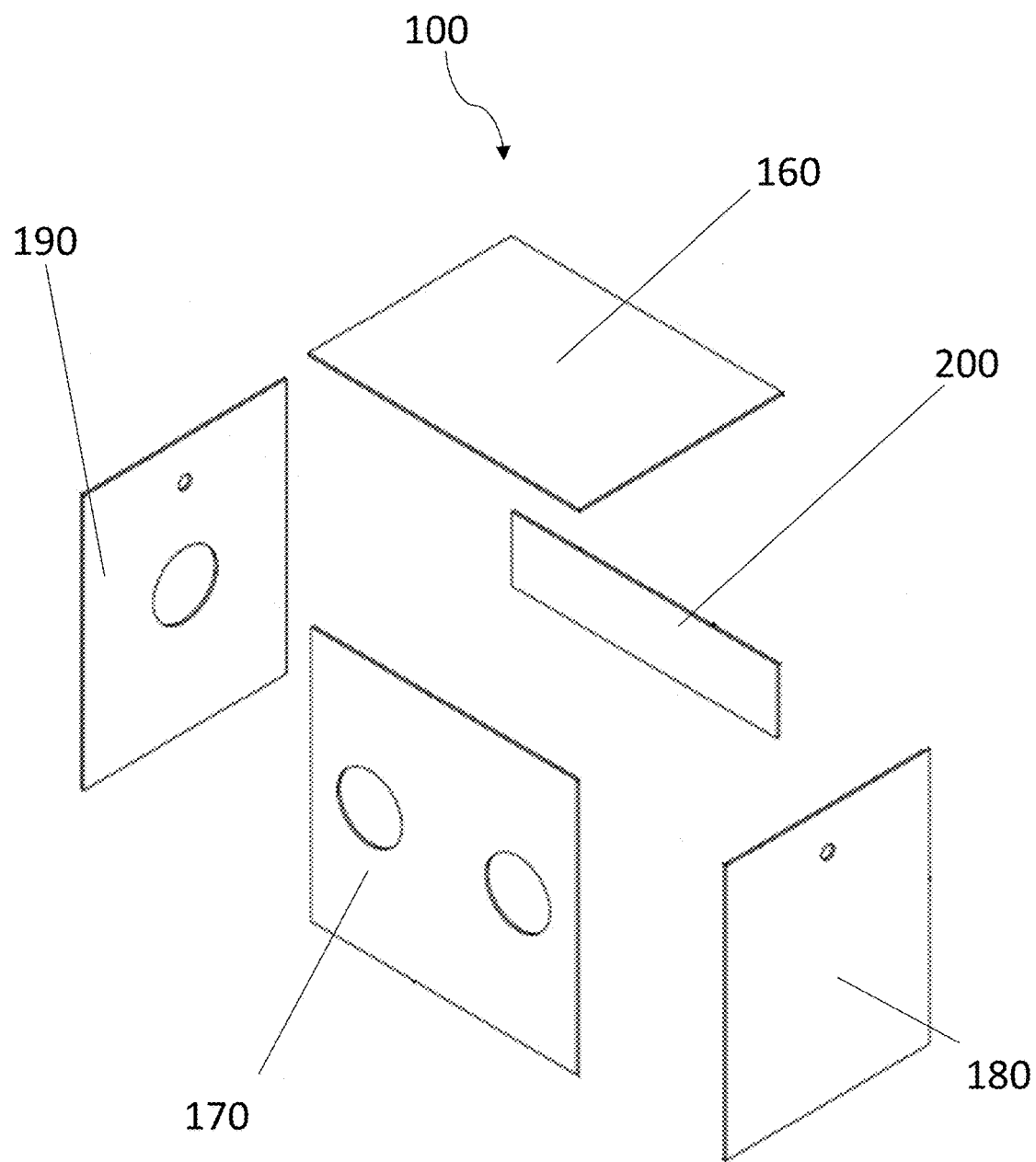
FIG. 6 illustrates an exploded view of a SCONE device according to one embodiment of the present invention.
Figure 7:
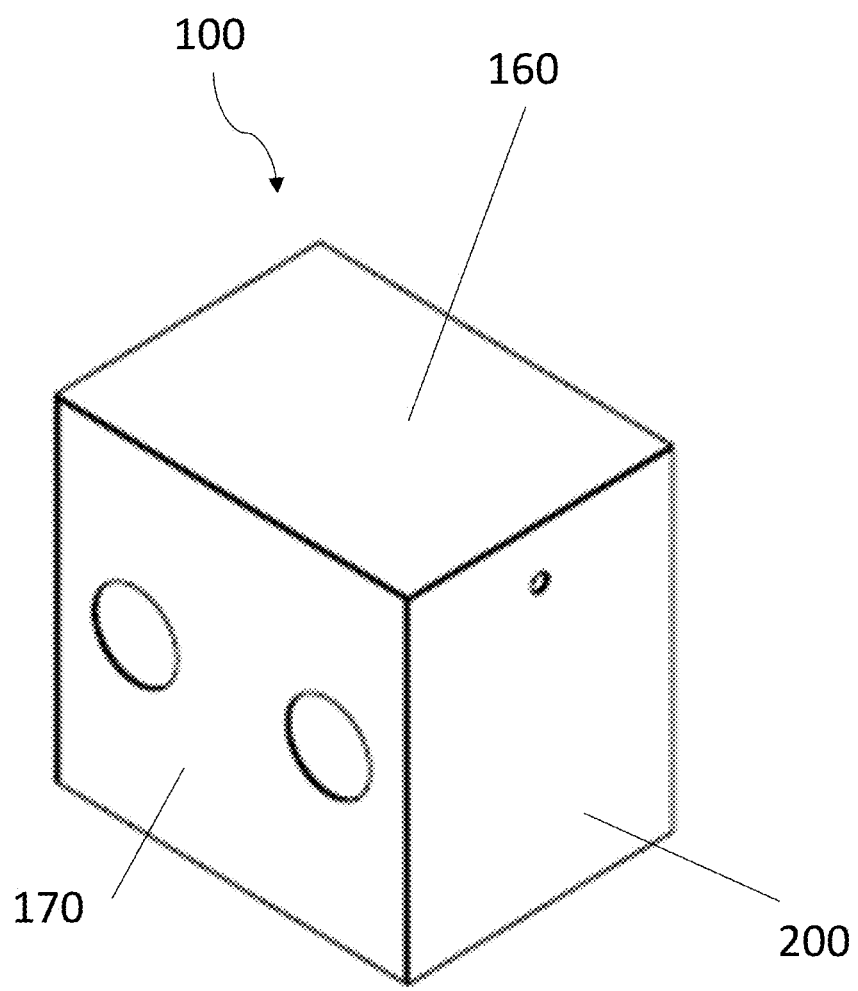
FIG. 7 illustrates an assembled SCONE device according to FIG. 6.
Figure 8:
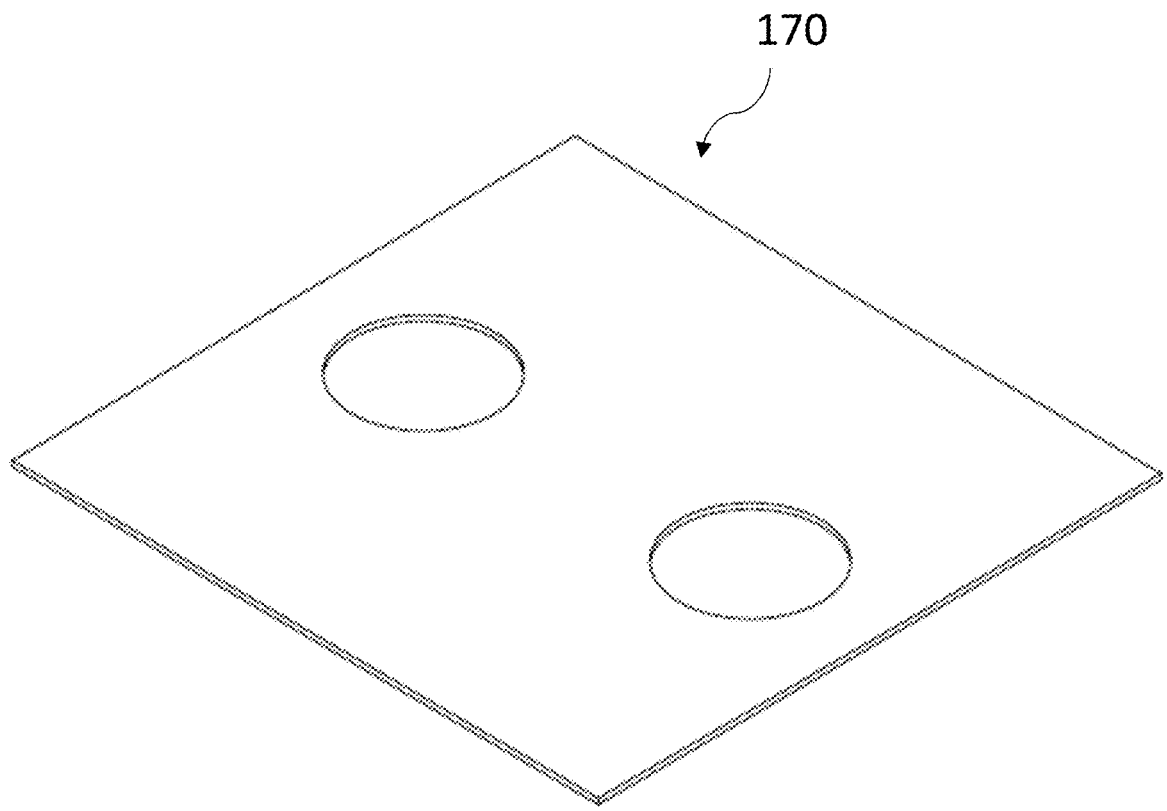
FIG. 8 illustrates a front perspective view of a front panel according to one embodiment of the present invention.

FIG. 6 illustrates an exploded view of a SCONE device according to one embodiment of the present invention. The SCONE device 100 includes a top panel 160, a front panel 170, a right panel 180, a left panel 190 and a rear panel 200. In one embodiment, the panels are configured for attachment via adhesives, latches, connectors, brackets, caulk, and/or other similar methods of attachment. FIG. 7 illustrates an assembled SCONE device according to FIG. 6. FIG. 8 illustrates a front panel according to one embodiment of the present invention. In one embodiment, the front panel 170 includes a clear polycarbonate material. For example and not limitation, the front panel 170 comprises a 3/16 inch clear polycarbonate sheet. In one embodiment, acrylic is not utilized for panels or any component of the SCONE device as acrylic is not operable to withstand repeated exposure to isopropyl alcohol. In one embodiment, the front panel 170 is approximately 20 inches by 20 inches.

Figure 9:
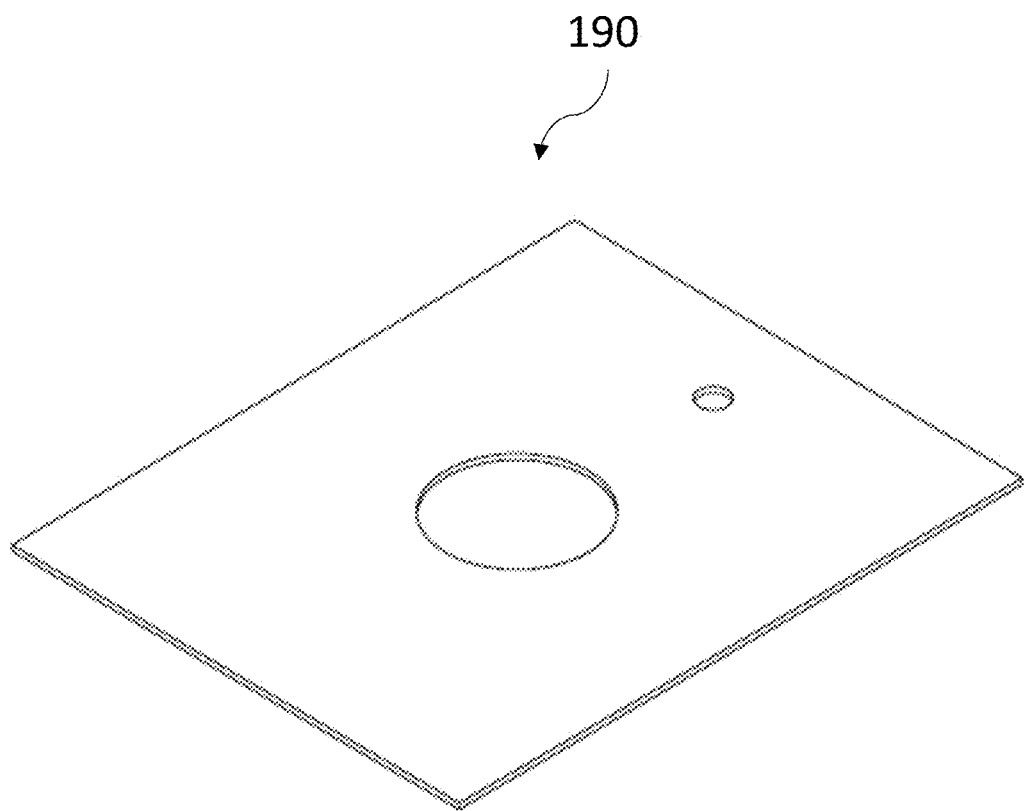
FIG. 9 illustrates a front perspective view of a left panel according to one embodiment of the present invention.

FIG. 9 illustrates a left panel according to one embodiment of the present invention. The left panel 190 includes a material. In one embodiment, the material is a 3/16 inch clear polycarbonate sheet stock. The left panel 190 further includes at least one hole to provide for arm access. The at least one hole is operable to receive at least one hole cover. In another embodiment, the left panel 190 is approximately 16 inches by 20 inches.

Figure 10:
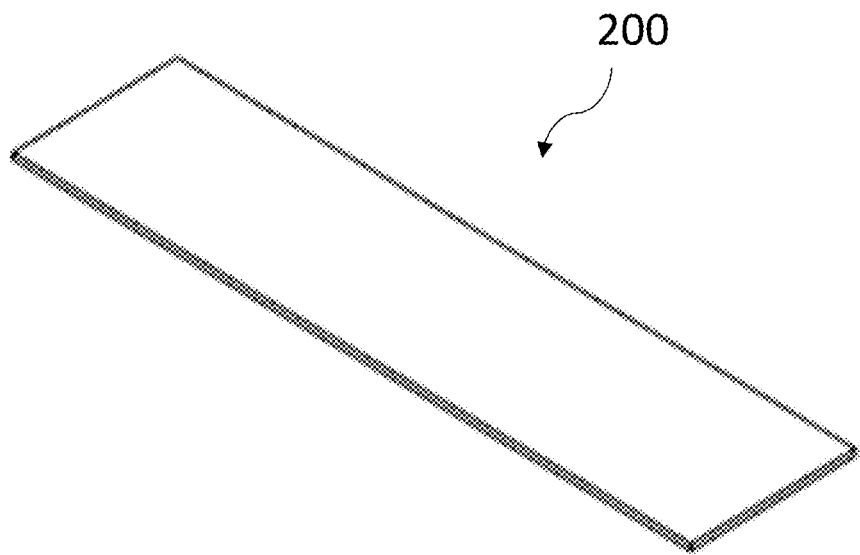
FIG. 10 illustrates a front perspective view of a rear panel according to one embodiment of the present invention.

FIG. 10 illustrates a rear panel according to one embodiment of the present invention. In one embodiment, the rear panel 200 includes a 3/16 inch clear polycarbonate sheet stock. In another embodiment, the rear panel 200 is approximately 21 inches by 5 inches.

Figure 11:
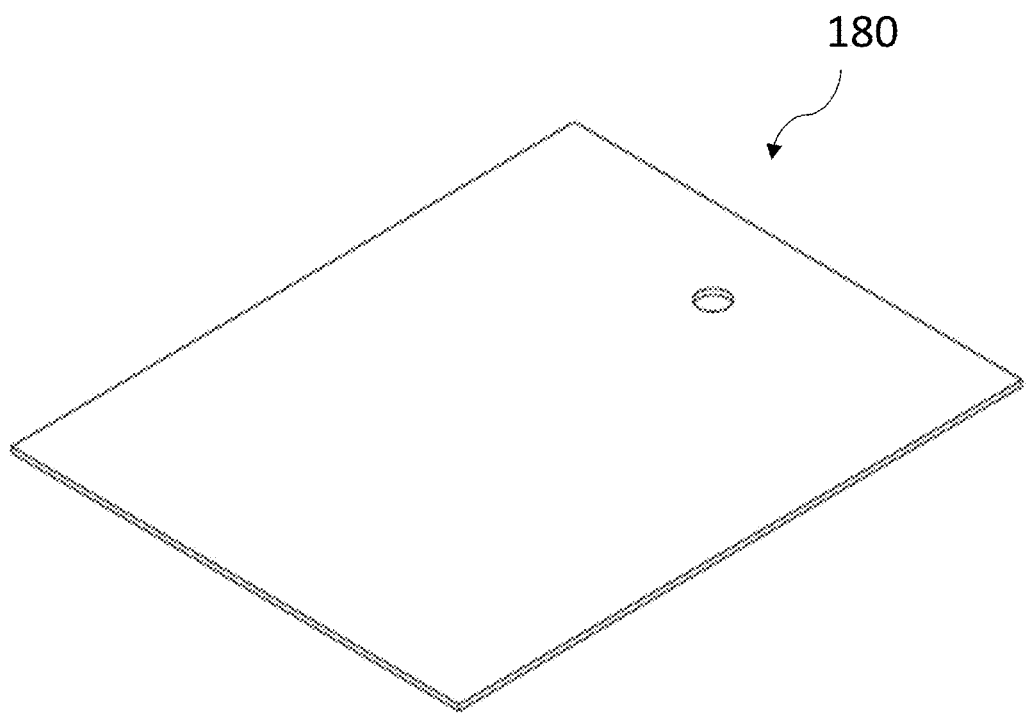
FIG. 11 illustrates a front perspective view of a right panel according to one embodiment of the present invention.
Figure 12:
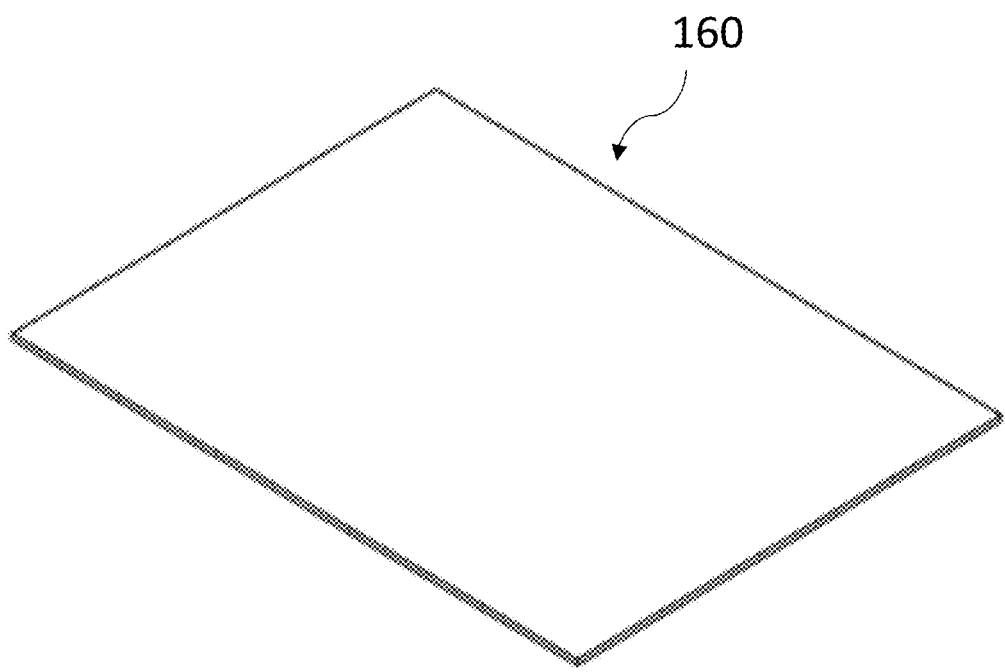
FIG. 12 illustrates a front perspective view of a top panel according to one embodiment of the present invention.

FIG. 11 illustrates a right panel according to one embodiment of the present invention. In one embodiment, the right panel 180 includes a 3/16 inch clear polycarbonate sheet stock. In another embodiment, the rear panel 180 is approximately 16 inches by 20 inches. FIG. 12 illustrates a top panel according to one embodiment of the present invention. In one embodiment, the top panel 160 is approximately 21 inches by 16 inches.

Figure 13:
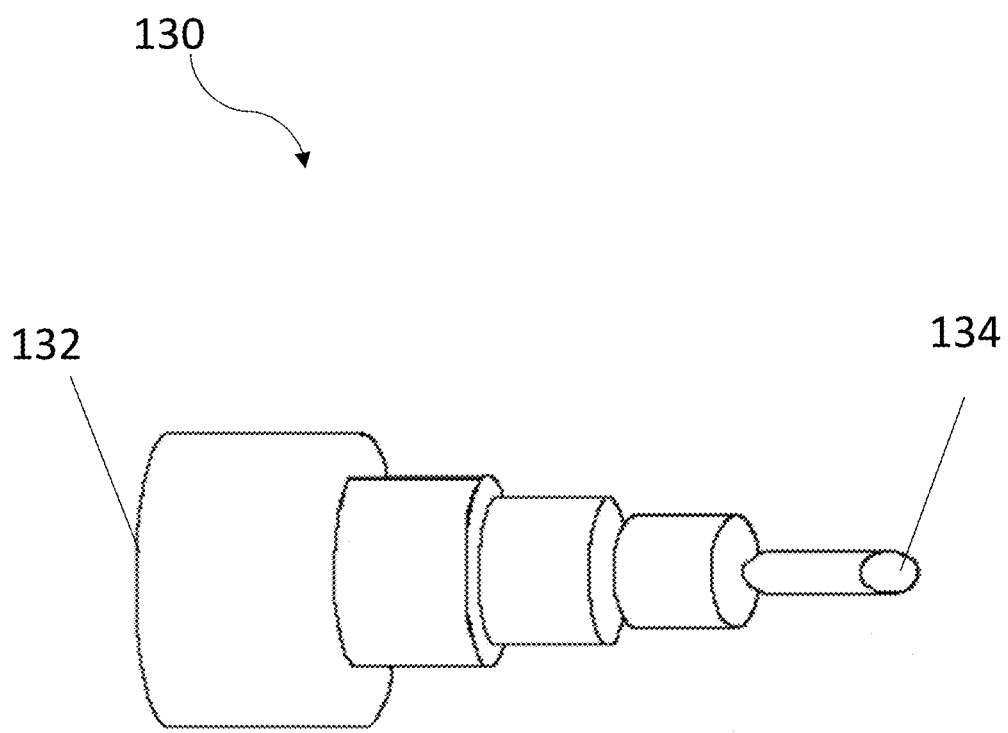
FIG. 13 illustrates a side perspective view of a step down adapter according to one embodiment of the present invention.
Figure 14:
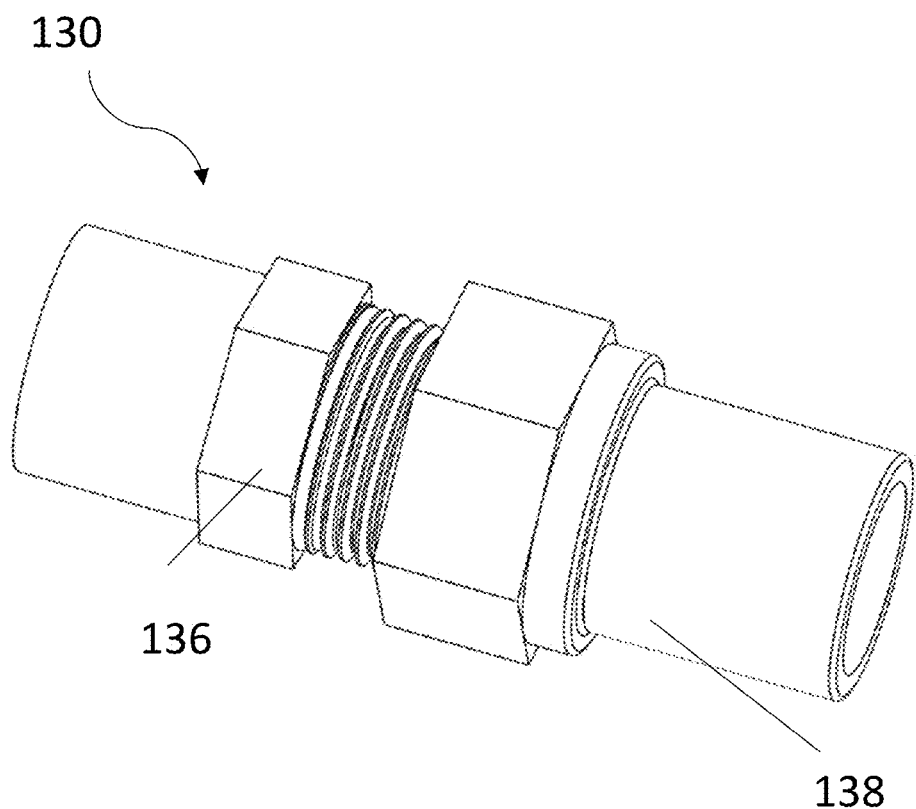
FIG. 14 illustrates a side perspective view of a step down adapter according to one embodiment of the present invention.
Figure 15:
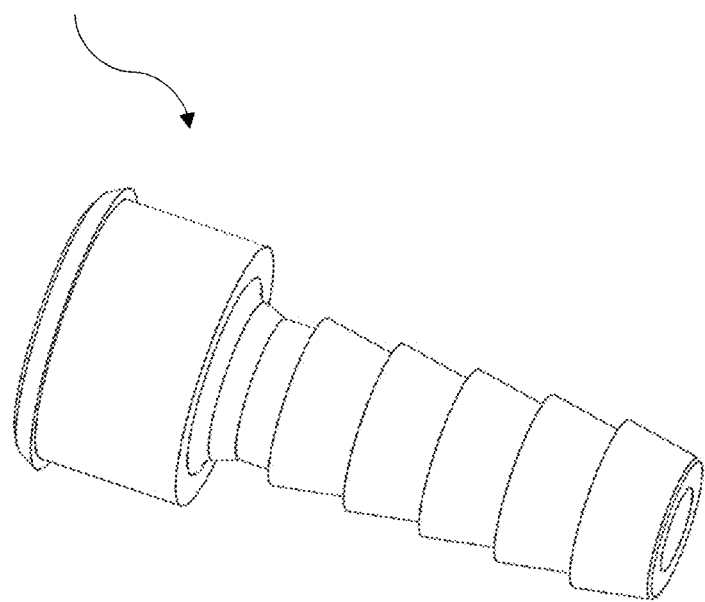
FIG. 15 illustrates a side perspective view of a component of a step down adapter according to one embodiment of the present invention
Figure 16:
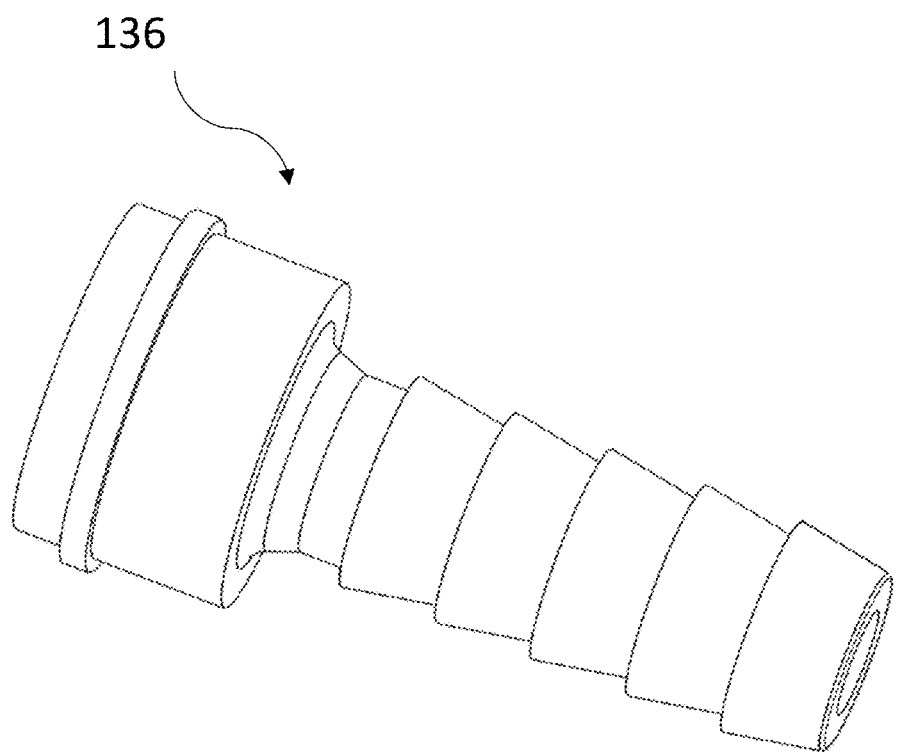
FIG. 16 illustrates a side perspective view of a component of a step down adapter according to one embodiment of the present invention.

FIG. 13 illustrates a step down adapter according to one embodiment of the present invention. The step down adapter 108 includes rubber and is configured to attach to at least one tube and hold the at least one tube in place. In one embodiment, the step down adapter 108 is approximately 4.5 inches in length with a hole diameter of ⅞ inches and an external diameter of 1⅜ inches. In another embodiment, the first stepdown inside the step down adapter 108 happens at the 2½ inches from the first end 132. The diameter at the second end 134 of the step down adapter 108 is ¼ inches. Advantageously, the step down adapter 108 is configured for quick release. In another embodiment, the diameter of the hole on the first end 132 is 13/16 inches with an external diameter of 1⅜ in. The first stepdown occurs at 1⅜ in. FIG. 14 illustrates a step down adapter according to embodiment of the present invention. The step down adapter 130 includes a first component 136 and a second component 138. In one embodiment, the tubing is held in place by frictional forces inside of the step down adapter. FIG. 15 includes a first component of a step down adapter according to one embodiment of the present invention. FIG. 16 includes a first component of a step down adapter according to one embodiment of the present invention.

Figure 17:
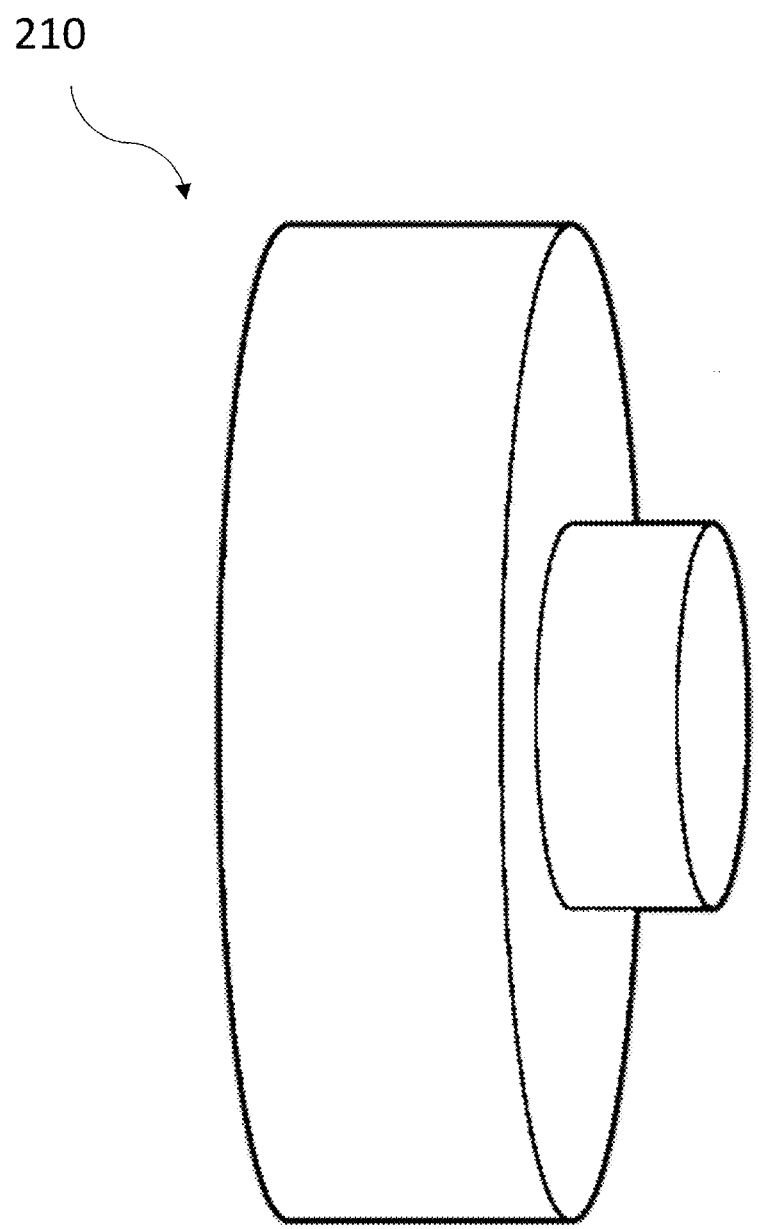
FIG. 17 illustrates a side perspective view of an arm hole cover according to one embodiment of the present invention.

FIG. 17 illustrates an arm hole cover according to one embodiment of the present invention. In one embodiment, the arm hole cover 210 includes a tapered end to fit securely into an arm hole. In another embodiment, the arm hole cover 210 is constructed out of plastic or vinyl.

Figure 18:
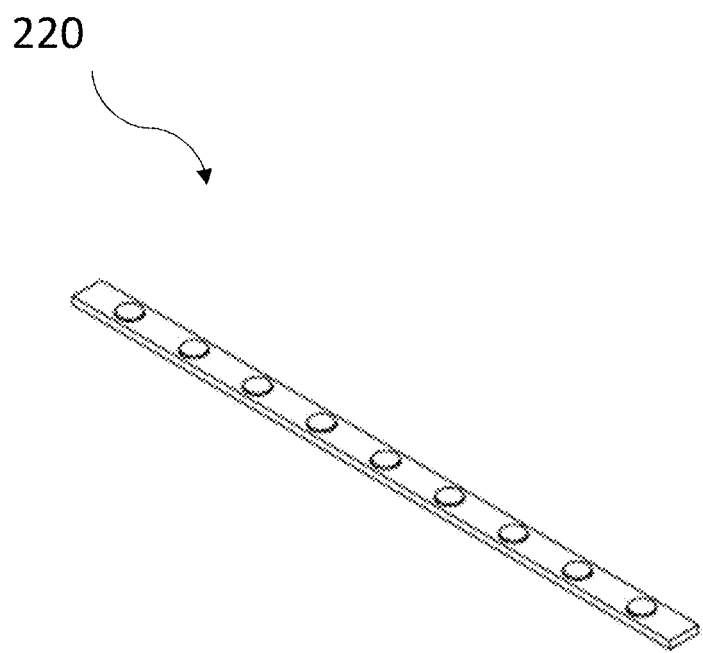
FIG. 18 illustrates a top perspective view of a magnetic fabric holder strip according to one embodiment of the present invention.
Figure 19:
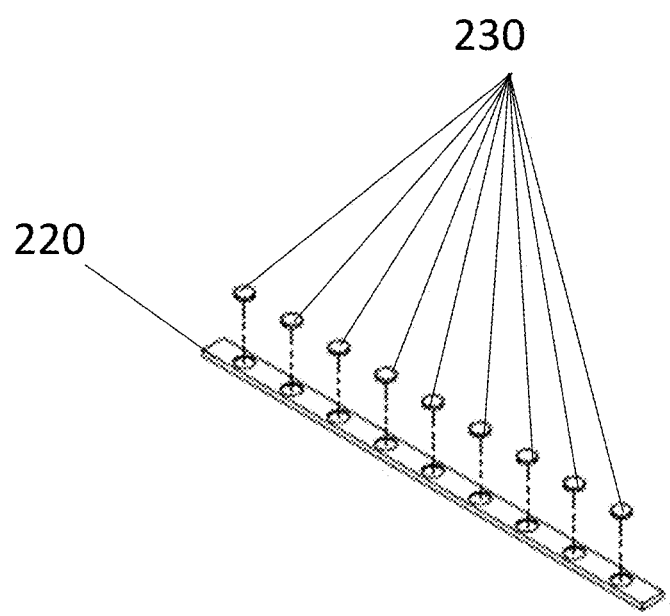
FIG. 19 illustrates an exploded view of a magnetic fabric holder strip according to one embodiment of the present invention.
Figure 20:
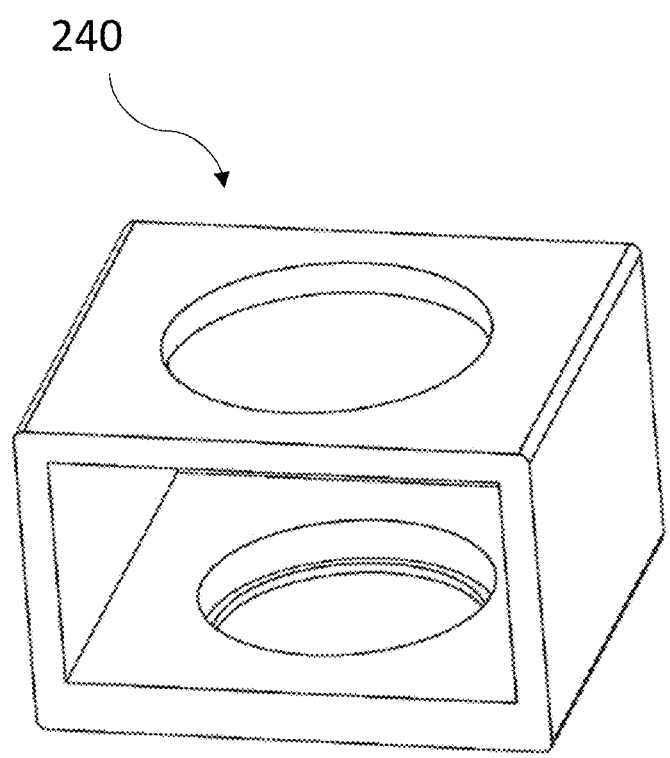
FIG. 20 illustrates a top perspective view of a magnet holder according to one embodiment of the present invention.

FIG. 18 illustrates a magnetic fabric holder strip according to one embodiment. In one embodiment, the magnetic fabric holder strip 220 is attached to the SCONE device surface with magnetic tape. In one embodiment, the magnetic fabric holder strip 220 includes at least one magnet. For example and not limitation, the at least one magnet includes a 0.7 in. neodymium magnet. FIG. 19 illustrates a magnetic fabric holder strip 220 with a plurality of magnets 230. The magnetic fabric holder strip 220 includes a plurality of holes to hold the plurality of magnets 230. The plurality of magnets 230 are operable to be joined with the magnetic fabric holder strip 220 by a magnet holder, adhesives or any other method known in the art. FIG. 20 illustrates a magnet holder according to one embodiment of the present invention. The magnet holder 240 is operable to hold a magnet and is movable along the fabric holder strip, thereby allowing the drape to be adapted to different patients and different hospital beds.

Figure 21:
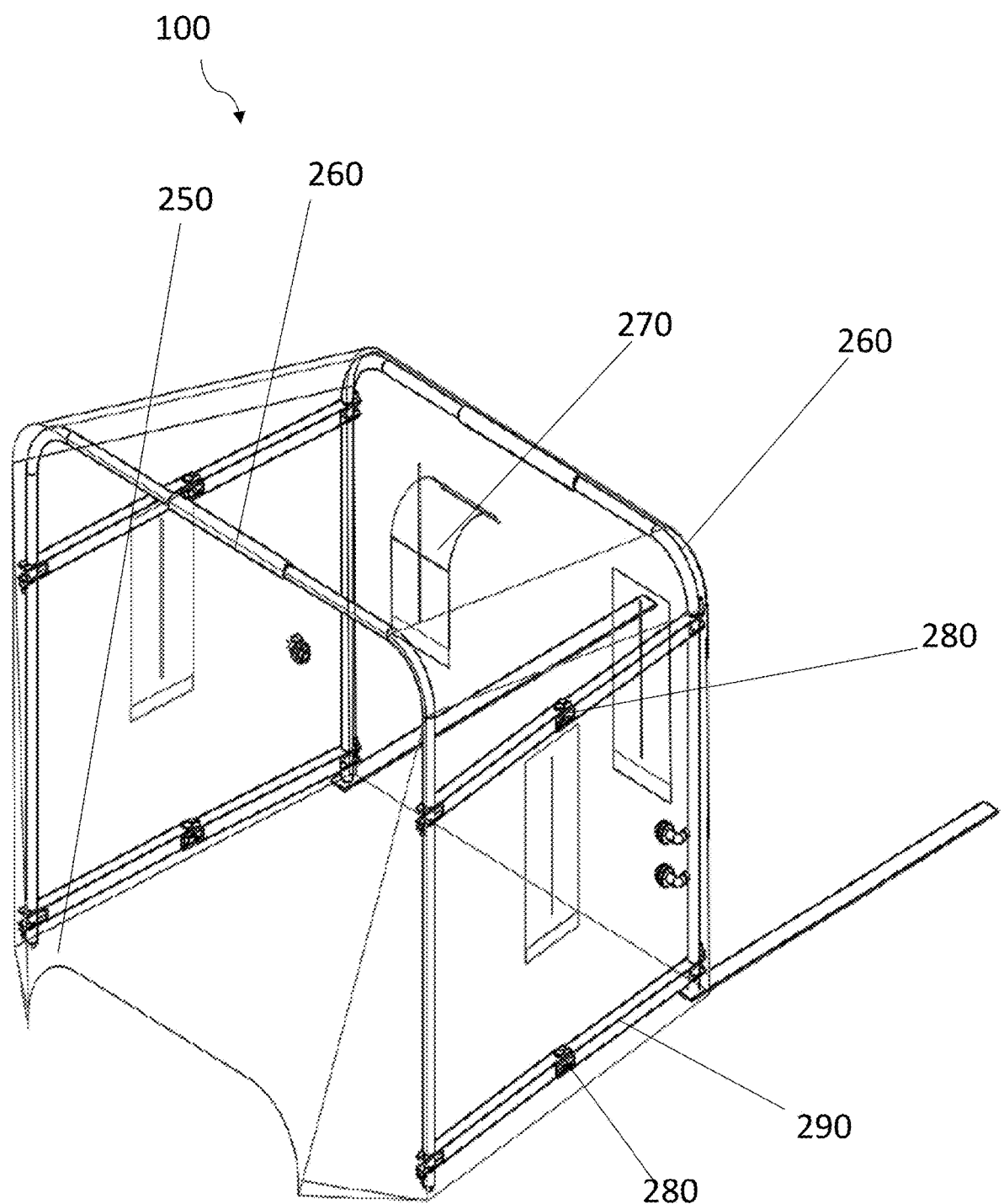
FIG. 21 illustrates an isometric perspective view of a SCONE device according to one embodiment of the present invention.

FIG. 21 illustrates an isometric perspective view of a SCONE device according to one embodiment of the present invention. The SCONE device 100 includes at least one polyvinyl chloride (PVC) film cover 250, at least one aluminum tube 260, at least one slit 270, at least one hinge 280, and at least one flexible tube 290. In one embodiment, the PVC film cover 250 is sewn or welded to the at least one aluminum tube 260. The at least one slit 270 in the PVC film cover 250 provides interior access. The at least one aluminum tube 260 is bent to provide structural support. The aluminum tube 260 is configured for extension or retraction via mechanisms in the art such as incorporating a telescopic component, a ratchet mechanism, and a push mechanism. The aluminum tube 260 enables the present invention to adapt to a variety of patient's width. The at least one hinge 280 allows for breakdown during shipment, storage and disposal of the present invention. The at least one hinge 280 and the at least one flexible tube 290 are collapsible. In one embodiment, the at least one hinge 280 is a spring loaded hinge. For example, and not limitation, the at least one hinge 280 includes a bungee cord and/or a compression spring. In another embodiment, the SCONE device further includes a ½ inch socket-connect female×½ inch NPT male PVC pipe adapter, a ½ inch socket-connect female×½ inch NPT female PVC pipe adapter, a step-down adapter, a tapered plug, and at least one magnetic tape.

Figure 22:
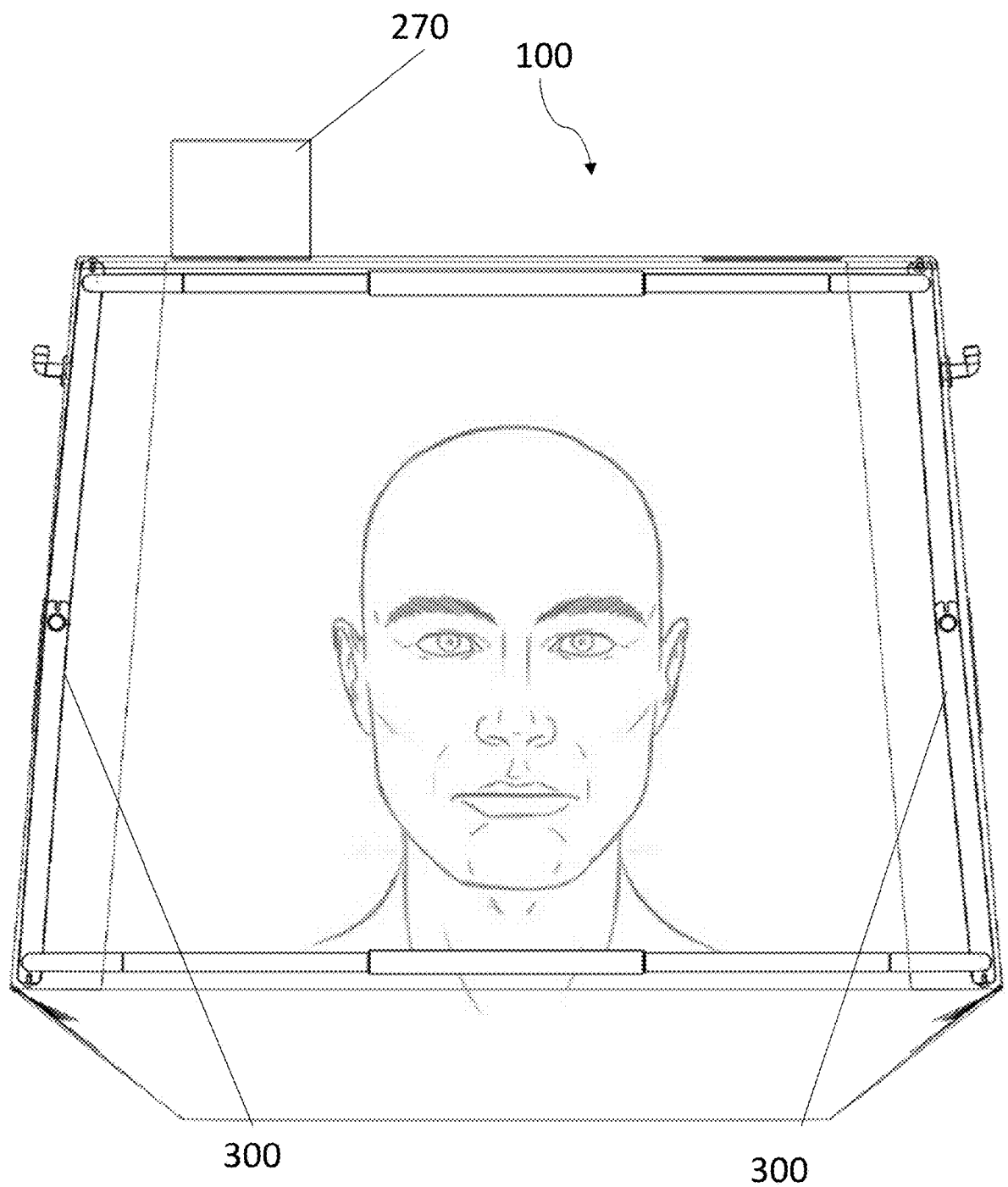
FIG. 22 illustrates a top orthogonal view of a SCONE device according to FIG. 21
Figure 23:
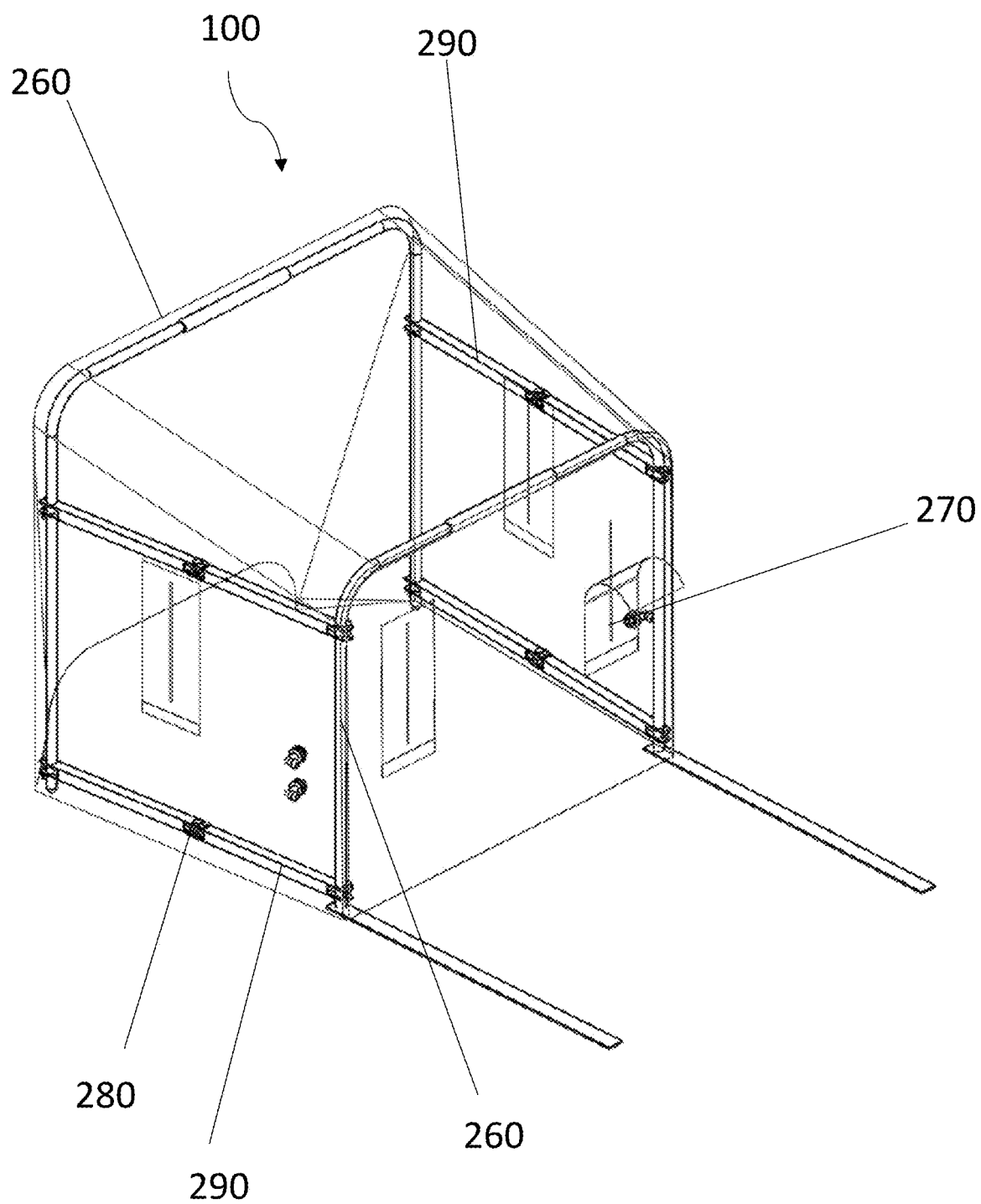
FIG. 23 illustrates a rear perspective view of the SCONE device according to FIG. 22.

FIG. 22 illustrates a top view of a SCONE device according to one embodiment of the present invention. The SCONE device includes at least one telescopic tube 300. The at least one telescopic tube 300 is configured to extend or retract the SCONE device to adapt to a patient's and/or a hospital bed's size. Advantageously, this allows for the healthcare personnel to increase their operating space without sacrificing structure stability or lowering the pressure of the SCONE device. FIG. 23 illustrates a side perspective of the SCONE device according to FIG. 21.

Figure 24:
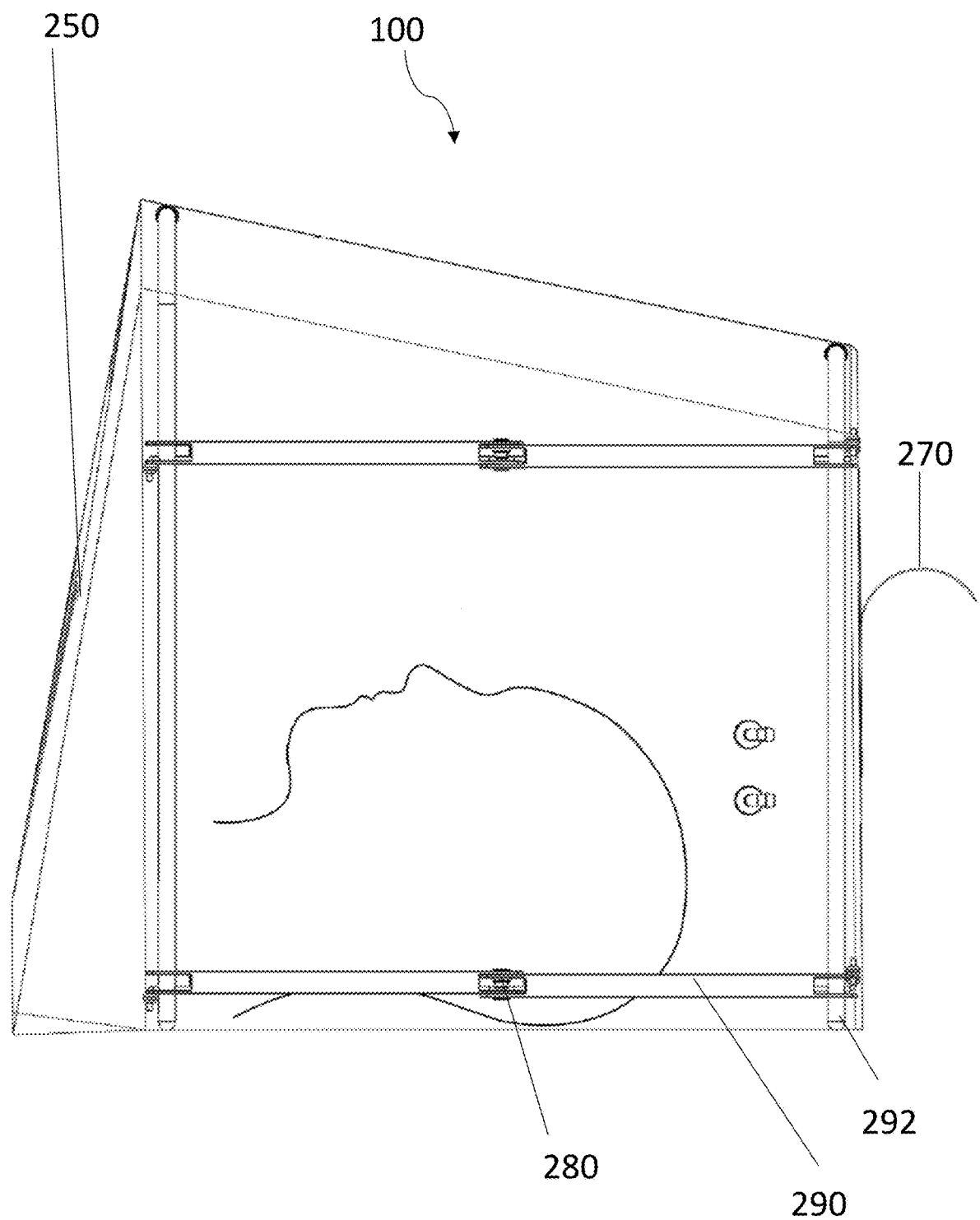
FIG. 24 illustrates a side orthogonal view of a SCONE device according to FIG. 23.

FIG. 24 illustrates a side view of a SCONE device according to one embodiment of the present invention. The SCONE device includes a slit 270 that is held with snaps, a hook and loop, adhesives, magnetics and/or other methods of attachment. The SCONE device 100 includes at least one slip 270, however at least one slip positioned on a lateral side as shown in FIG. 23 is omitted from FIG. 24 for clarity. The SCONE device also includes a foot component 292 to connect to a hospital bed. The foot component 292 prevents the SCONE device 100 from sliding when the bed is angled. Alternatively, the SCONE device includes at least one hook and loop (e.g. VELCRO®) to attach to the hospital bed and other operating spaces.

Figure 25:
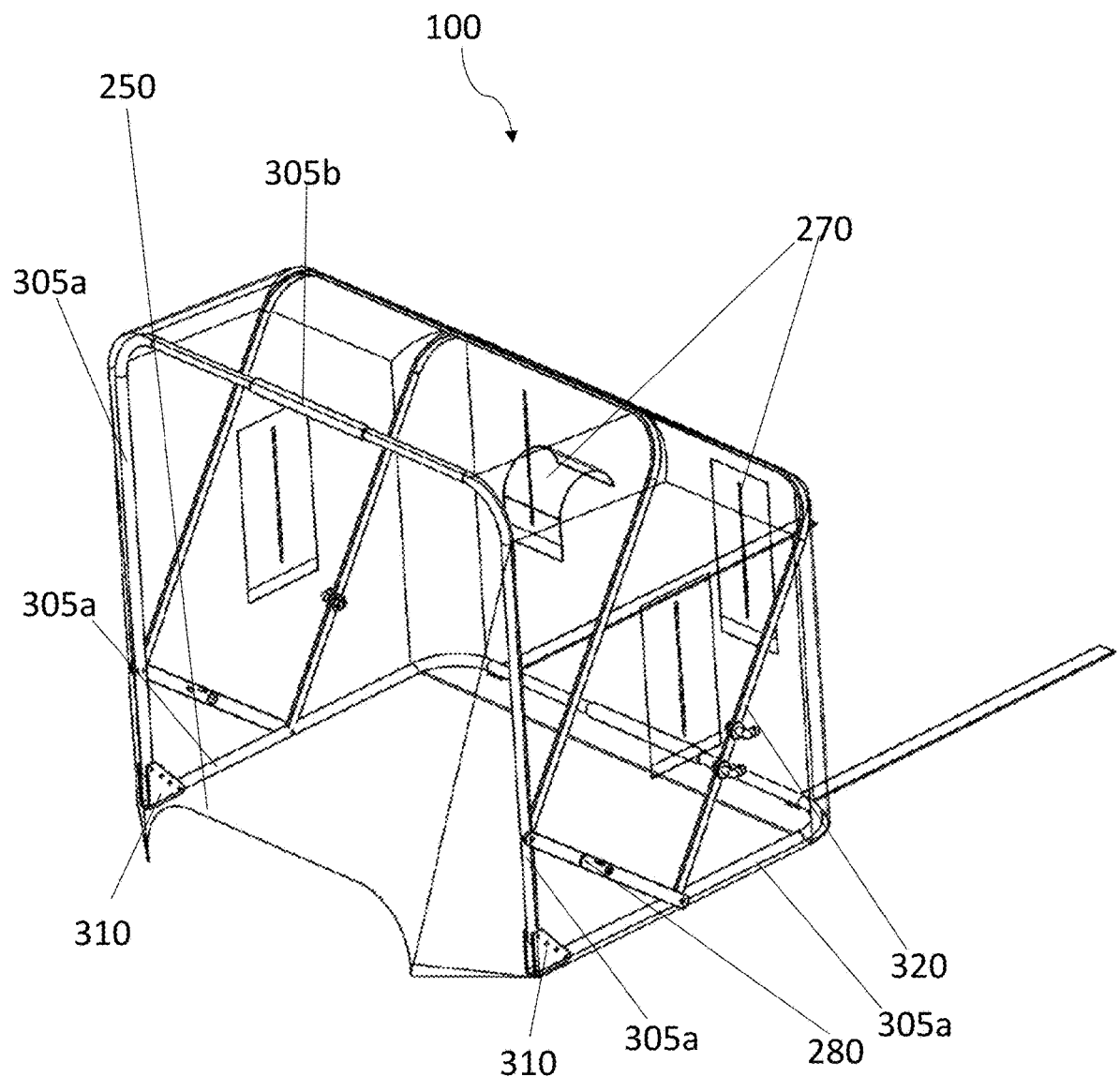
FIG. 25 illustrates a side isometric perspective view of a SCONE device according to one embodiment of the present invention.

FIG. 25 illustrates an isometric perspective of a SCONE device according to one embodiment of the present invention. The SCONE device 100 includes a PVC film cover 250, two structural support members 305, each having two legs 305*a* and a connecting crossbar 305*b*, at least one angle bracket 310, at least one slit 270 in the PVC film cover 250, at least one brace 320, and at least one locking hinge 280. In some embodiments, the two structural support members 305 are aluminum tubes. The PVC film cover 250 is sewn or welded to the structural support members 305. The at least one slit in the PVC film cover 270 provides access to the interior of the SCONE device 100. The at least one brace 320 provides structural support. The at least one brace 320 includes a multiplicity of structural support members and at least one cross bar to connect the multiplicity of structural support members. The at least one crossbar includes at least one locking hinge 280. The at least one locking hinge 280 allows for the SCONE device 100 to be folded and locked into place when extended. In another embodiment, the SCONE device 100 includes a biasing member that is configured to lock when the SCONE device 100 is deployed. In some embodiments, the biasing member is positioned between the legs of the two support members. In some embodiments, the biasing member may include a spring. The spring is also operable to retract the SCONE device 100. In one embodiment, the spring is adjustable to allow for the size and tension of the SCONE device 100 to be varied as needed. Increasing the spring tension creates a larger SCONE device. Decreasing the spring tension allows for the SCONE device to collapse and/or to decrease the size of the SCONE device. In some embodiments, the legs 305*a* of the support members 305 are substantially parallel.

In some embodiments, the SCONE device 100 may have open and closed positions. In an open position, the legs 305*a* of the two support members 305 of the SCONE device are substantially orthogonal, as shown in FIG. 25. In some embodiments, in a closed position, the SCONE device 100 may be substantially planar. In other embodiments, in a closed position, the SCONE device 100 may not be substantially planar, but an angle between the legs of the two support members may be lesser than 90 degrees. In some embodiments, the locking hinge 280 of the brace 320 is operable to lock the SCONE device 100 into place at both a fully open position and at a position between that of fully open and fully closed.

Figure 26:
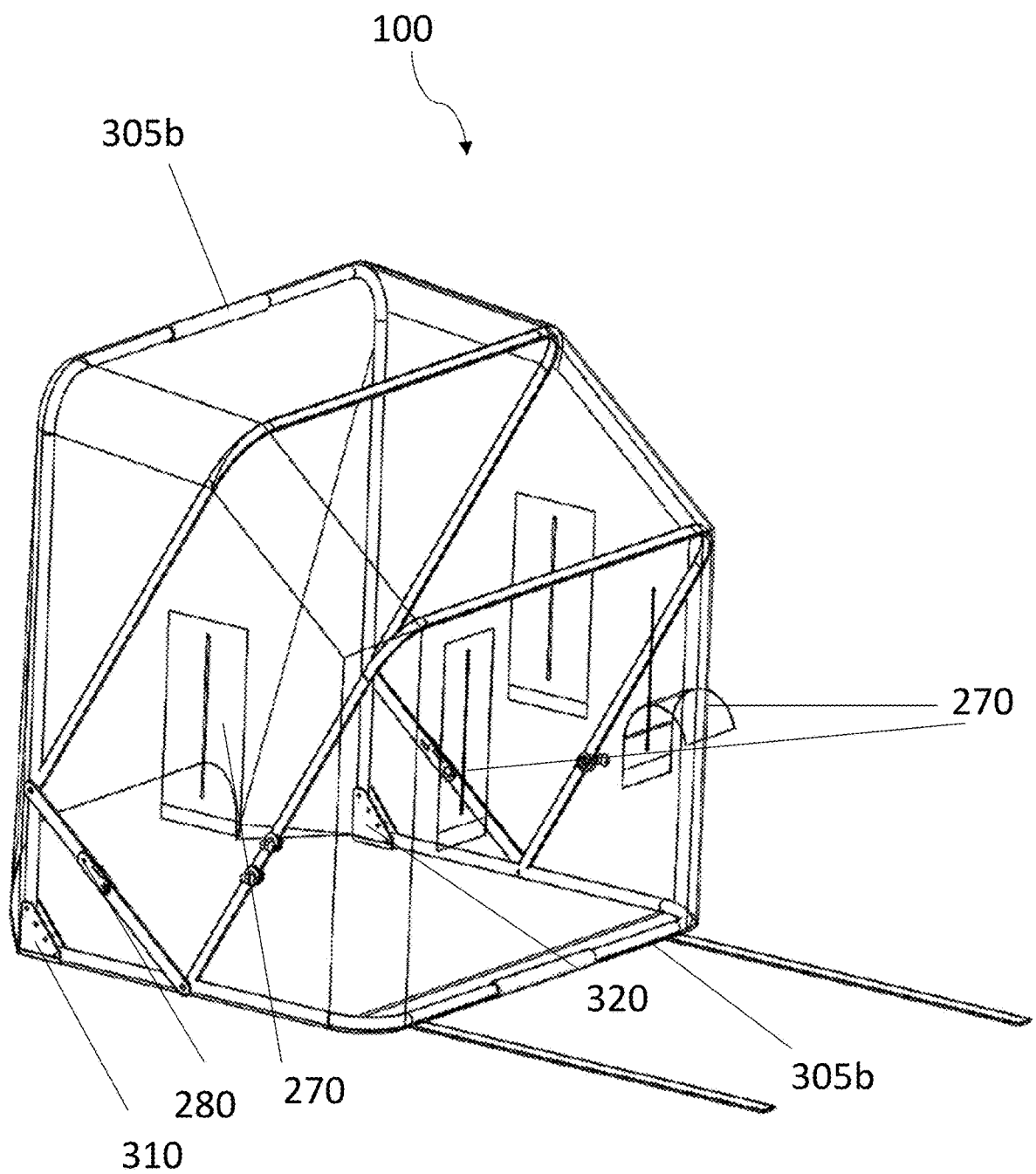
FIG. 26 provides a rear perspective view of a SCONE device according to FIG. 25.
Figure 27:
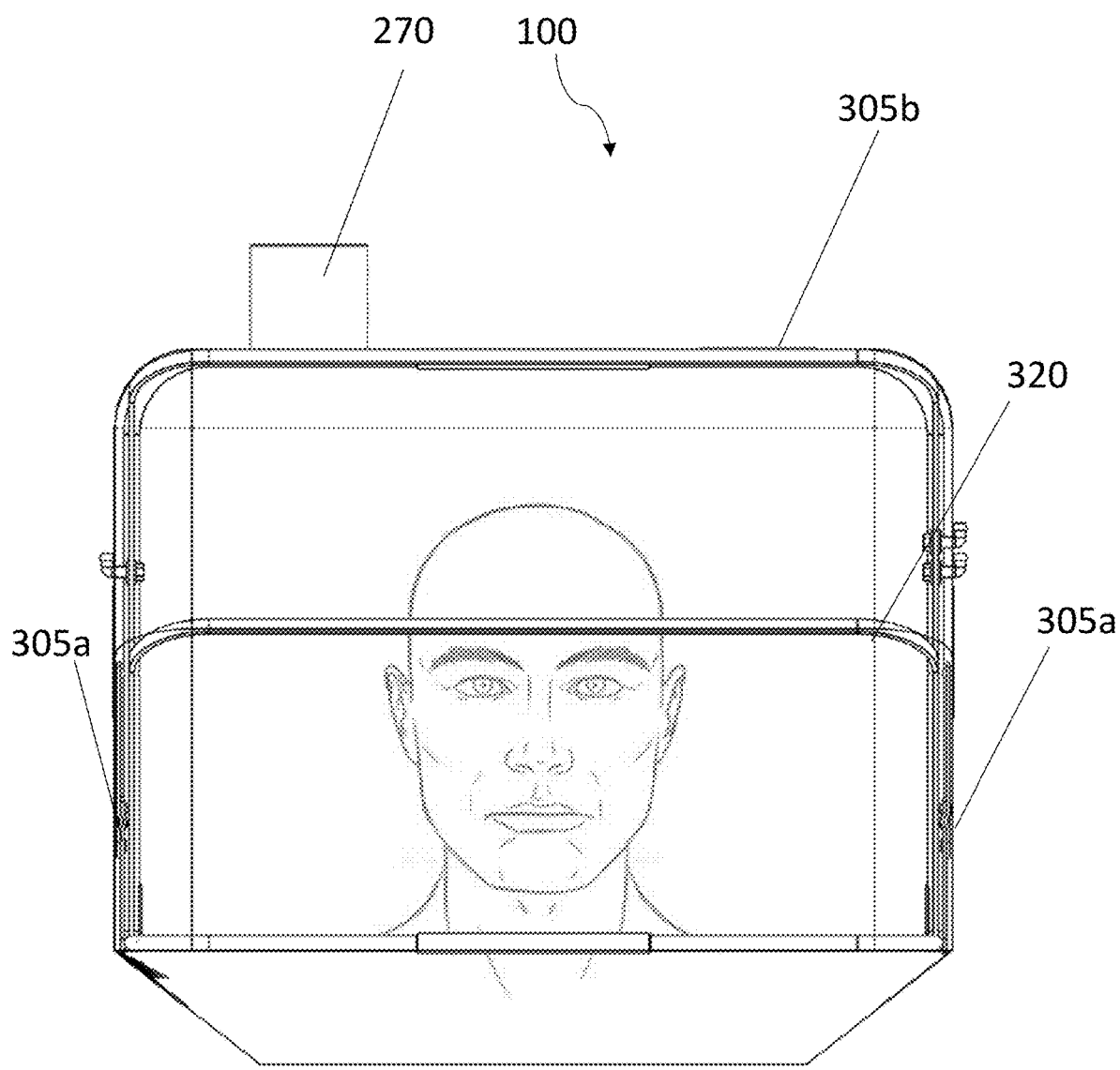
FIG. 27 illustrates a top orthogonal view of a SCONE device according to FIG. 26.
Figure 28:
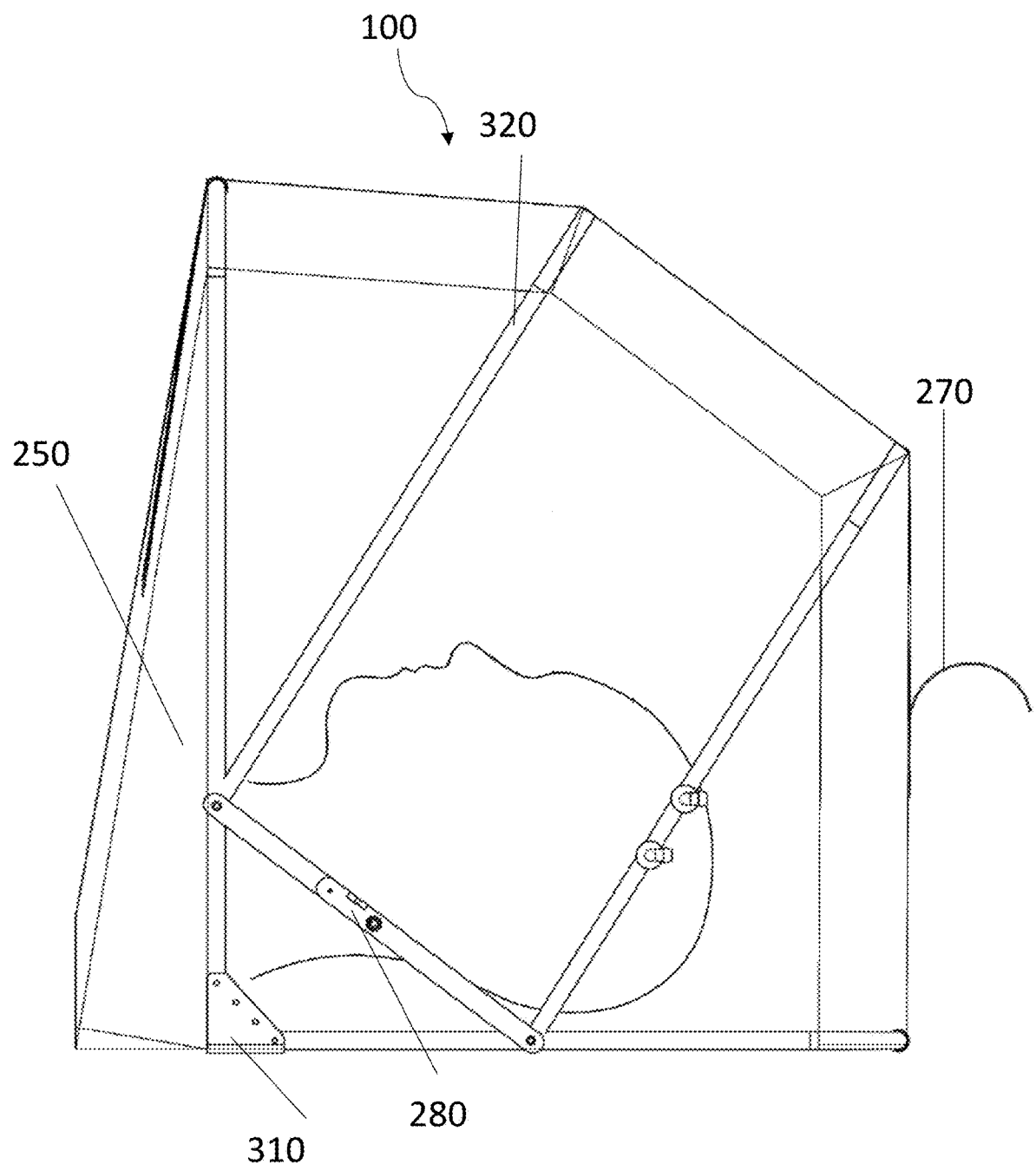
FIG. 28 illustrates a side orthogonal view of FIG. 27.

FIG. 26 provides a rear perspective of the SCONE device 100 according to FIG. 25. FIG. 27 illustrates a top view according to one embodiment of the present invention. The slit 270 is operable to be held with snaps, a hook and loop, adhesive, magnetics and/or other methods of attachment. FIG. 28 illustrates a side orthogonal view of FIG. 27. The SCONE device 100 includes at least one slit 270, however at least one slit positioned on a lateral side as shown in FIG. 26 is omitted from FIG. 28 for clarity. A list of parts and materials for one embodiment are provided below in Table 1.

TABLE 1

Parts and Materials for One Embodiment of a SCONE device

| Description | Quantity | Materials | Certs |
| --- | --- | --- | --- |
| 6 mm Clear Vinyl Cover | 1 | PVC | N/A |
| Frame body (0.375" OD) | 4 | Aluminum 6061 | N/A |
| Frame bracket | 2 | Nickle plated stainless | N/A |
| Frame hinge | 6 | Polypropylene | N/A |
| Frame C-clamp | 20 | PVC | N/A |
| 90-degree barb fitting (¼ NPT × ⅜") | 2 | Polypropylene | N/A |
| 90-degree barb fitting (¼ NPT × ¼") | 1 | Polypropylene | N/A |
| Washer | 6 | Rubber | N/A |
| Locknut (¼NPT) | 3 | Nylon | N/A |
| Cap (for ⅜" OD) | 3 | Elastomer | Medical Grade |
| Double-sided tape for arm holes | N/A | Acrylic | Non-Medical Grade |

Figure 29:
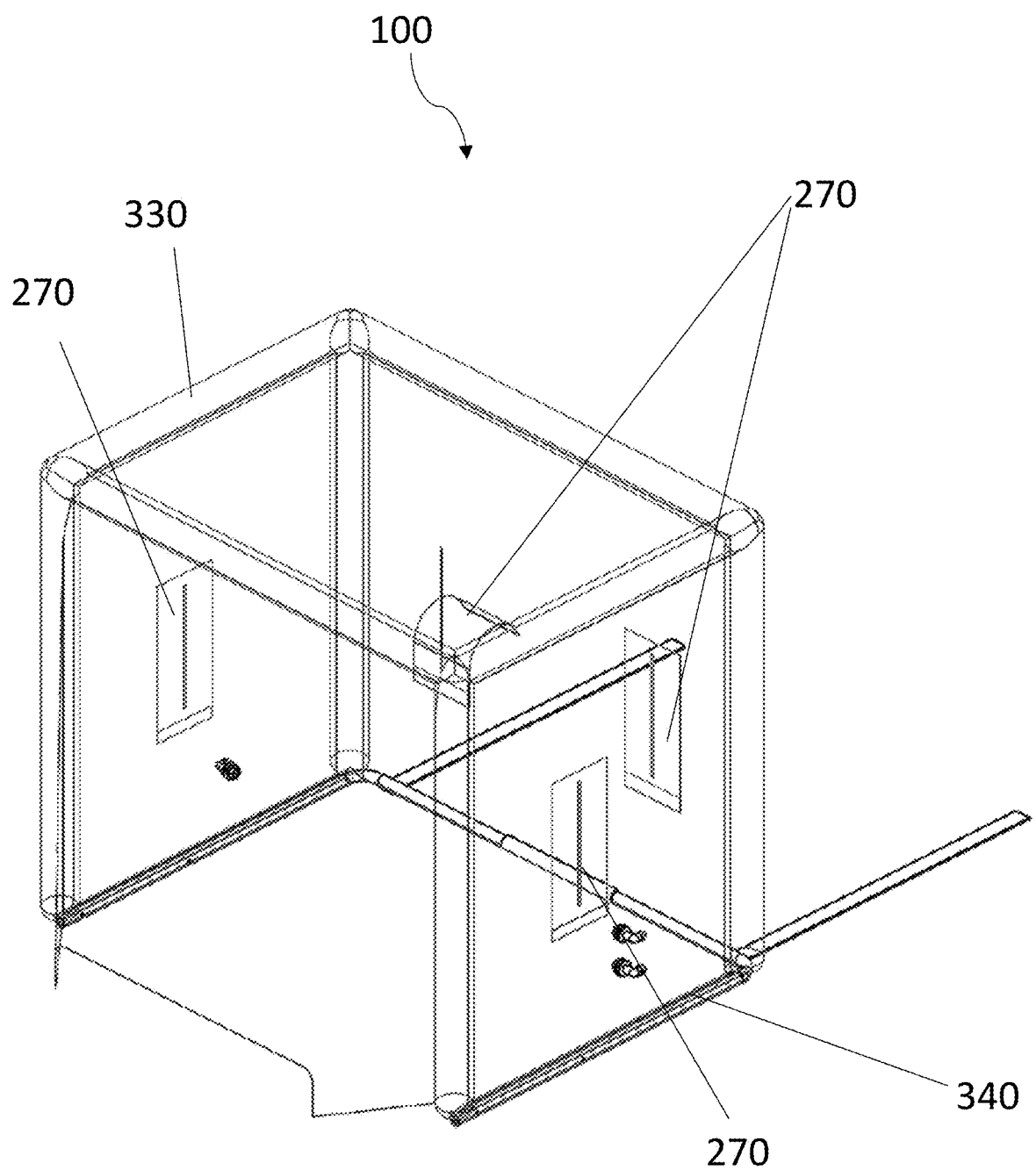
FIG. 29 illustrates a side perspective view of a SCONE device according to one embodiment of the present invention.
Figure 30:
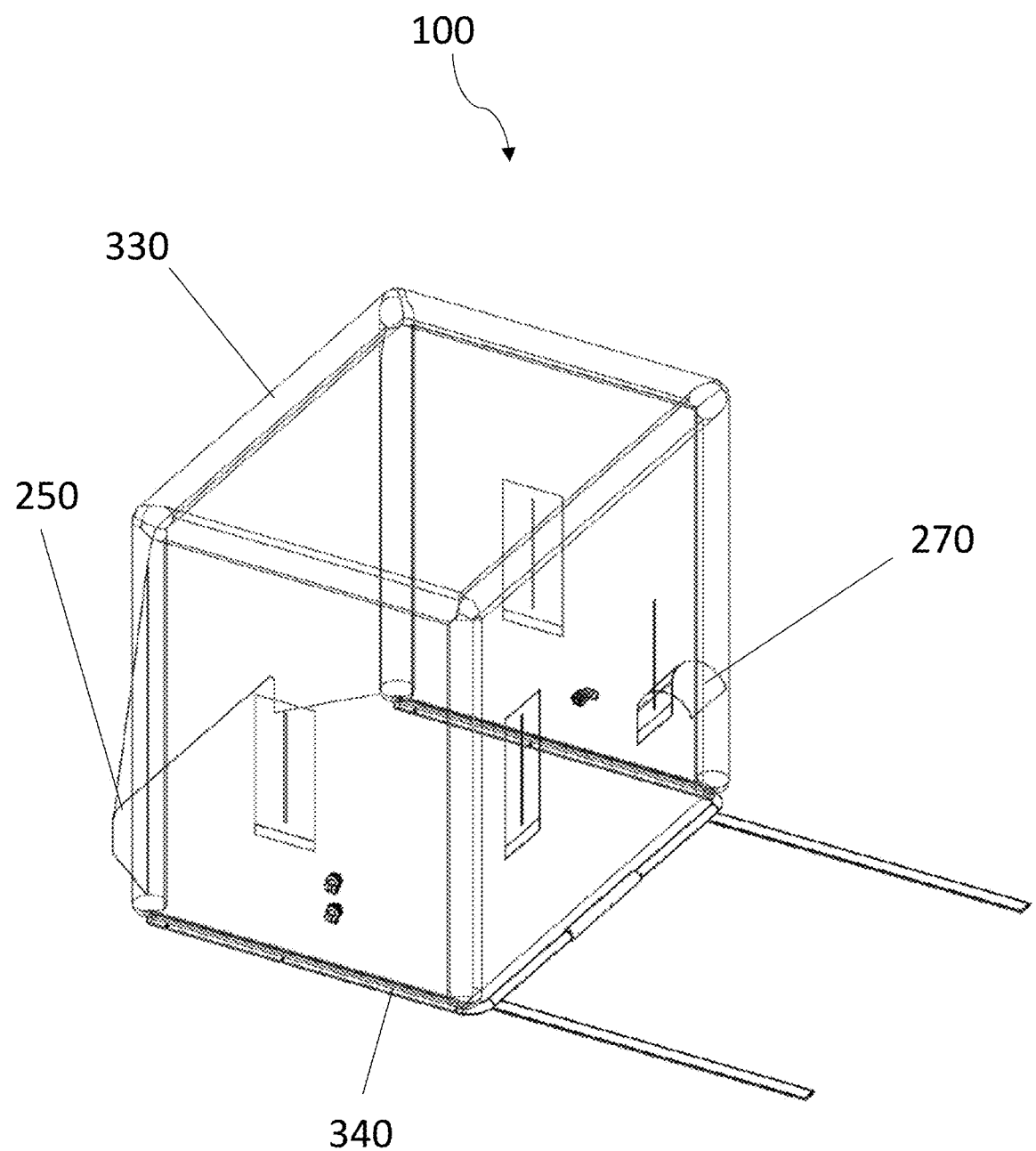
FIG. 30 provides a rear perspective view of a SCONE device according to FIG. 29.
Figure 31:
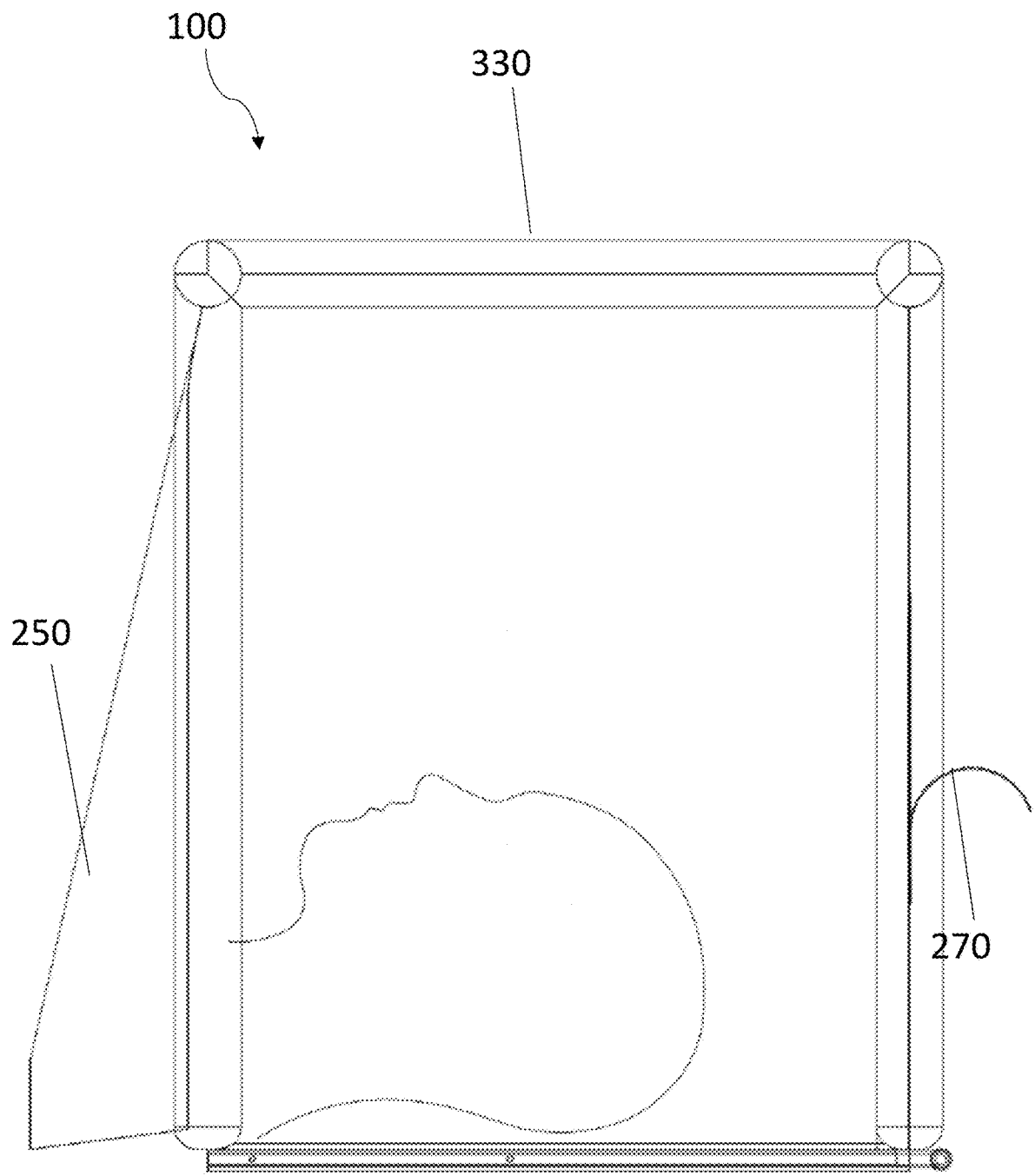
FIG. 31 illustrates a side orthogonal view of FIG. 30.

FIG. 29 illustrates a SCONE device according to one embodiment of the present invention. The SCONE device 100 includes a 2-ply welded cover with an inflation tube 330. The SCONE device further includes a bent base 340 and at least one slit 270. In one embodiment, the bent base 340 includes a metal material. In another embodiment, the bent base 340 includes a plastic material. The inflation tube 330 provides support on the sides. FIG. 30 provides a rear perspective of a SCONE device according to FIG. 29. FIG. 31 illustrates a side view of FIG. 29. The SCONE device 100 includes at least one slip 270, however at least one slip positioned on a lateral side as shown in FIG. 29 is omitted from FIG. 31 for clarity. Advantageously, the present invention is operable to be bent to a desired width. In another embodiment, the present invention is operable for extension or retraction via a locking ratchet mechanism or a push mechanism.

Figure 32:
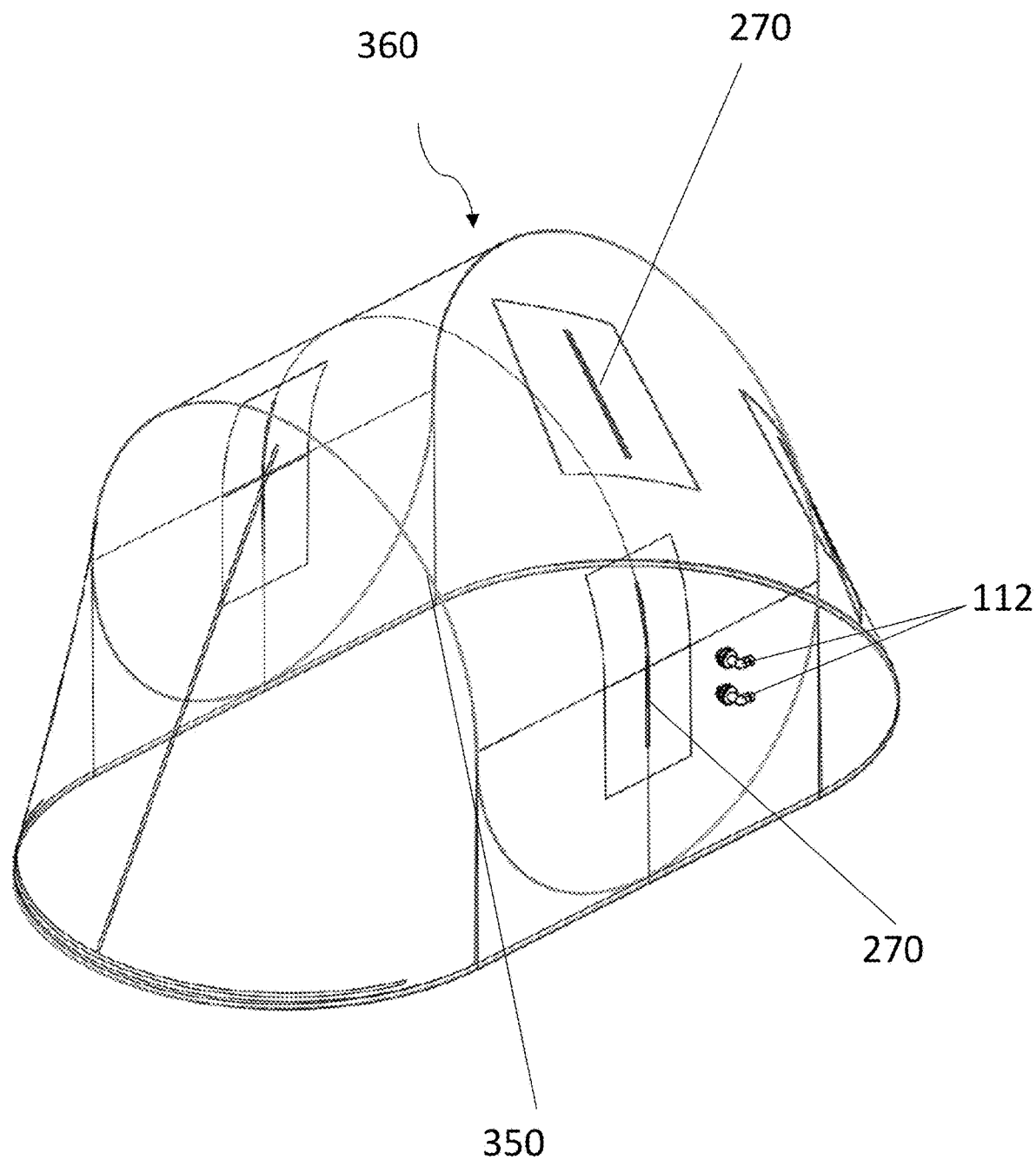
FIG. 32 illustrates a front perspective of a barrier protection device according to one embodiment of the present invention.
Figure 33:
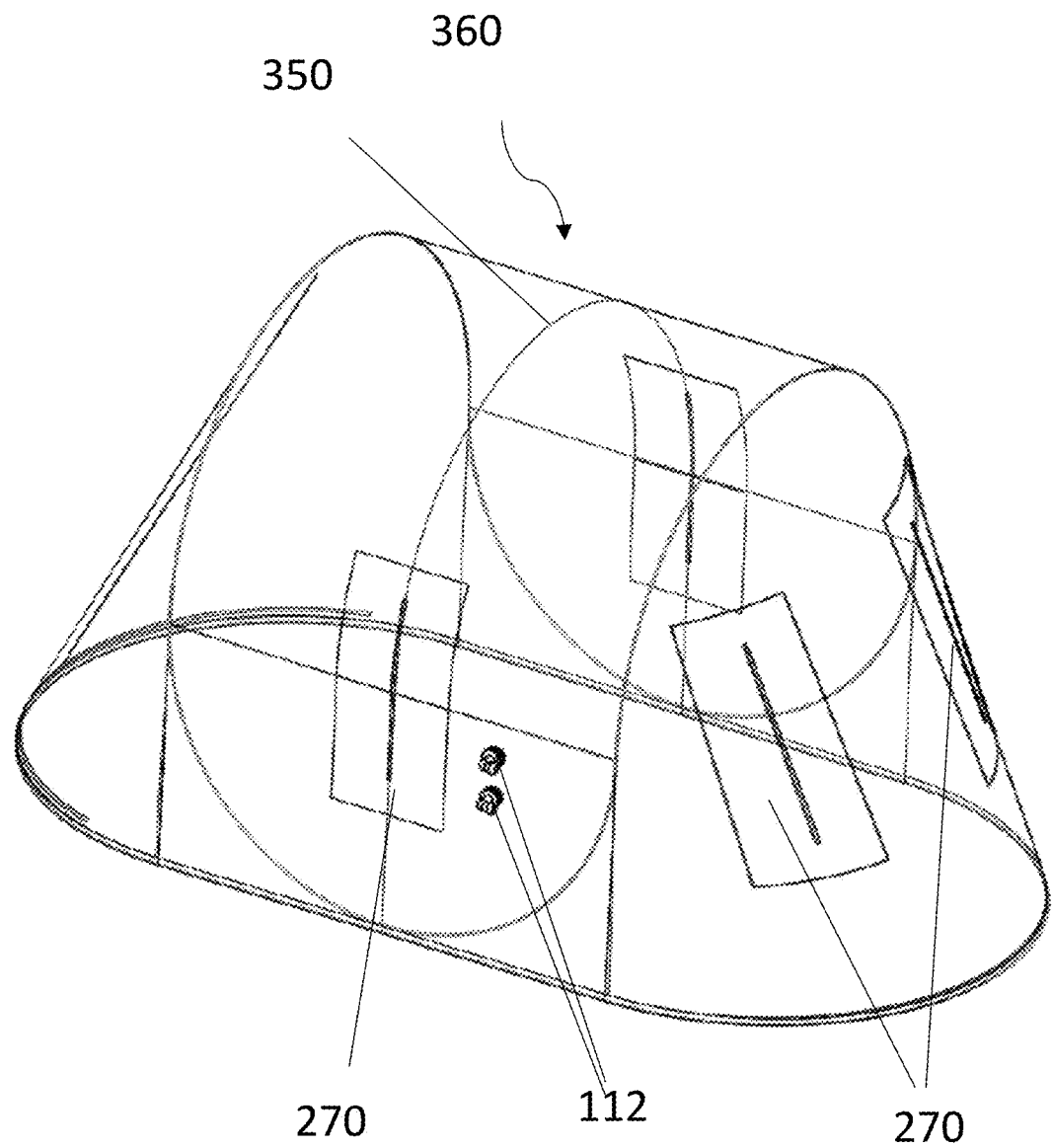
FIG. 33 illustrates a rear perspective of a barrier protection device according to one embodiment of the present invention.

FIG. 32 illustrates a barrier protection device according to one embodiment of the present invention. In one embodiment, the barrier protection device 360 is configured for rapid deployment. The barrier protection device 360 includes a bendable wire frame 350 and at least one slit 270. Advantageously, the present invention is operable for the barrier protection device 360 to be prepackaged and to pop into shape once it is removed from packaging. In one embodiment, the package including the barrier protection device 360 is vacuum sealed. The barrier protection device 360 is operable to be utilized for aerosolization and emergency applications (e.g. transportation of a patient without a ventilator). Advantageously, the barrier protection device 360 includes at least one connection port 112. The at least one connection port 112 is operable to attach to vacuum tubing, air/oxygen tubing, and other tubing used during medical procedures. The present invention is configured to limit patient exposure during travel and to provide a barrier protection device that is immediately usable after reaching a desired location (e.g. a hospital). The barrier protection device 360 is collapsible and/or foldable. The barrier protection device 360 is further operable to support a PVC film cover which covers the wire frame 350 of the barrier protection device 360. In yet another embodiment, the barrier protection device has the shape of 4-sided cube. FIG. 33 illustrates a rear perspective of a barrier protection device according to one embodiment of the present invention.

Figure 34:
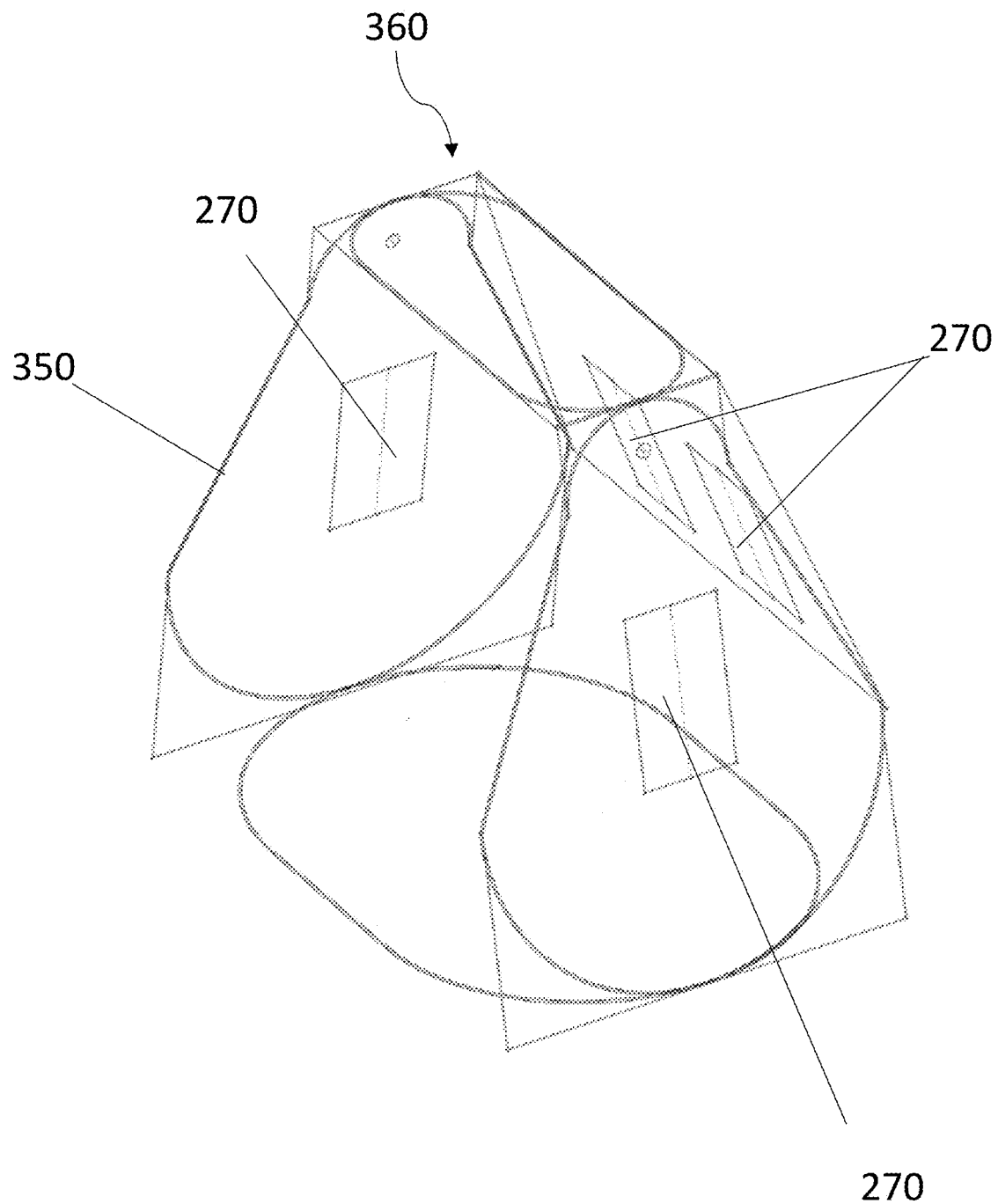
FIG. 34 illustrates a front perspective of a barrier protection device according to one embodiment of the present invention.

FIG. 34 illustrates a front perspective of a barrier protection device according to another embodiment of the present invention. The barrier protection device 360 of FIG. 34 includes a wire frame 350 with two ends and a rectangle top portion of the frame connecting the two ends. The two ends are rectangular in shape at the base without the top side of the rectangle, with the base portion of the end being connected to a top rectangle shape without a bottom side by two tapered sides which are as wide as the rectangle shape at the base at one end and as wide as the top rectangle shape at the other end. In one embodiment, the barrier protection device 360 is slanted and/or angled from top to bottom. The base of the barrier protection device 360 is wider than the top of the barrier protection device 360. The wider base allows for more area around a patient's face and increases the operating space inside of the barrier protection device. In another embodiment, the base of the barrier protection device is configured for a variety of shapes such as rectangular and elliptical shapes.

Figure 35:
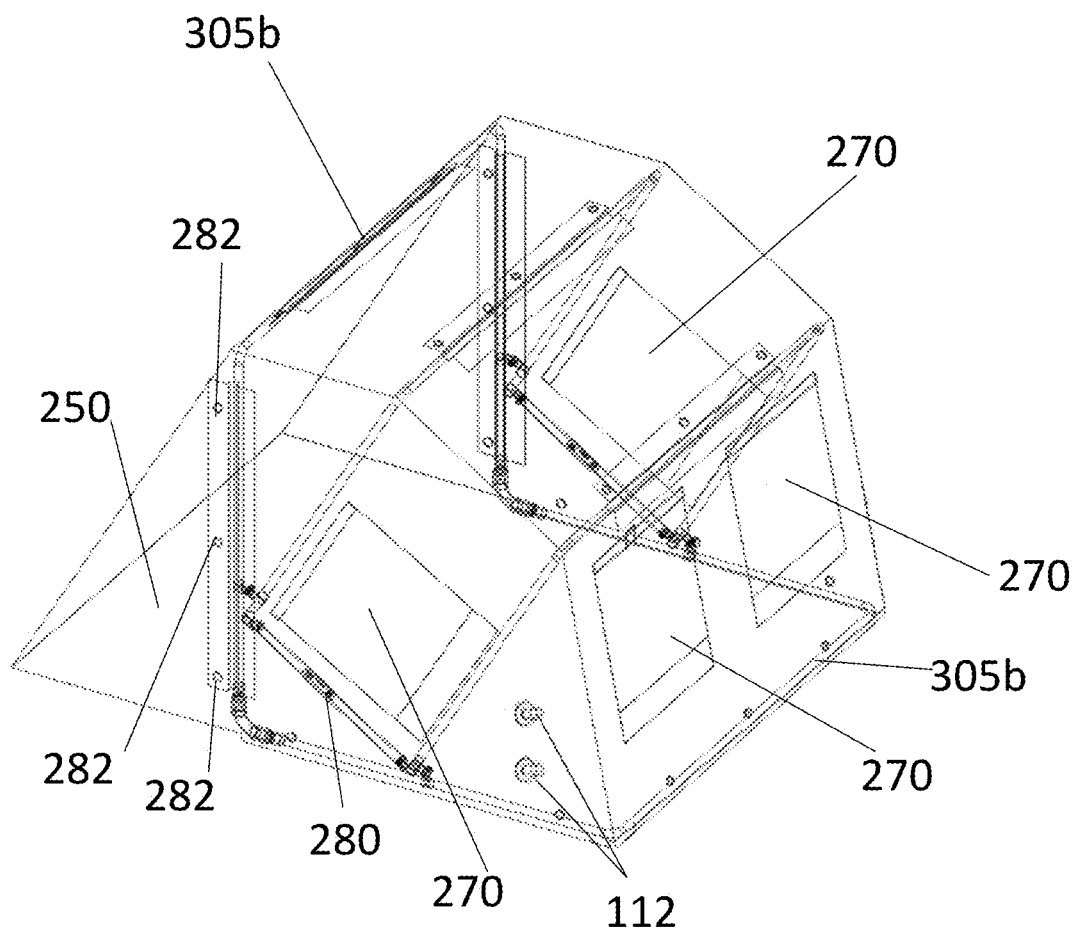
FIG. 35 illustrates a SCONE device according to one embodiment of the present invention.
Figure 36:
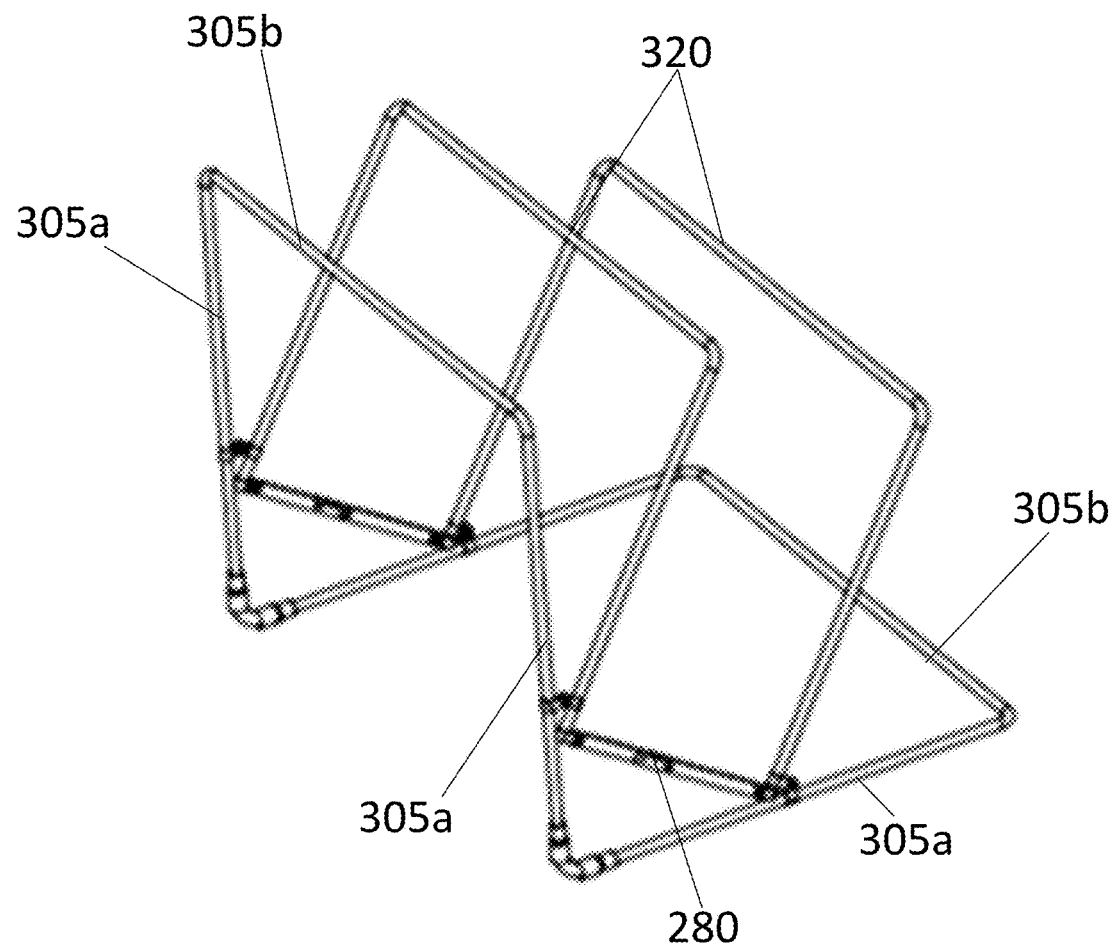
FIG. 36 illustrates an assembled frame of a SCONE device according to one embodiment of the present invention.

FIG. 35 illustrates a SCONE device according to one embodiment of the present invention. In one embodiment, the SCONE device 100 includes at least one cover attachment point 282 for a vinyl cover. In one embodiment, the at least one cover attachment point 282 includes a welded hinge, a retention strip and/or a female snap fastener. The female snap fastener is operable to receive the male snap fastener of the vinyl cover. In another embodiment, the SCONE device 100 includes heat shrinking tubing around the end of each support member. The heat shrinking tubing is connected to a closely wound spring that enables the SCONE device to collapse. In one embodiment, the present invention includes a hook and loop strap (e.g. Velcro®) sewn to the vinyl cover 250. The hook and loop strap is operable to go around a bed frame and attach to itself. FIG. 36 illustrates an assembled frame of a SCONE device according to one embodiment of the present invention.

Figure 37:
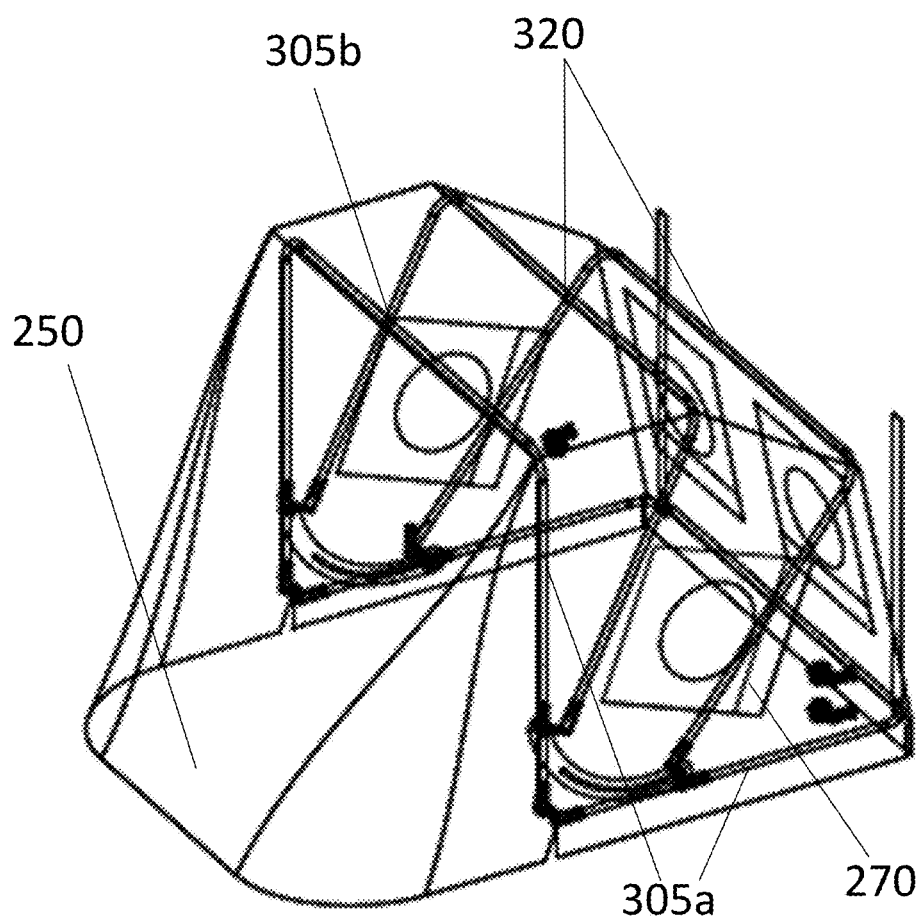
FIG. 37 illustrates a SCONE device according to one embodiment of the present invention.
Figure 38:
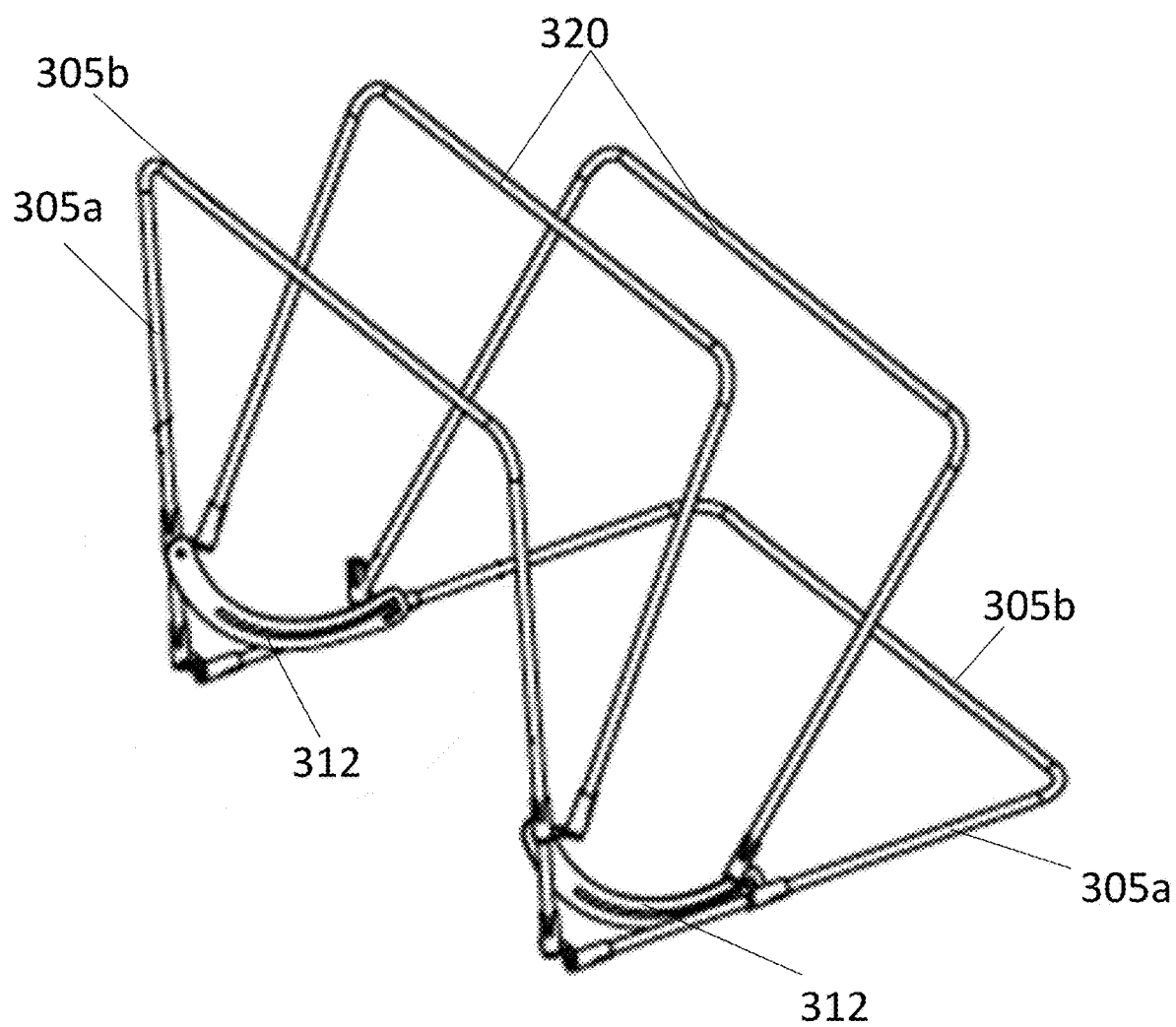
FIG. 38 illustrates an assembled frame of the SCONE device of FIG. 37.

FIG. 37 illustrates a SCONE device according to one embodiment of the present invention. FIG. 38 illustrates an assembled frame of the SCONE device of FIG. 37. In one embodiment, the SCONE device includes a slidable locking hinge 312.

Figure 39:
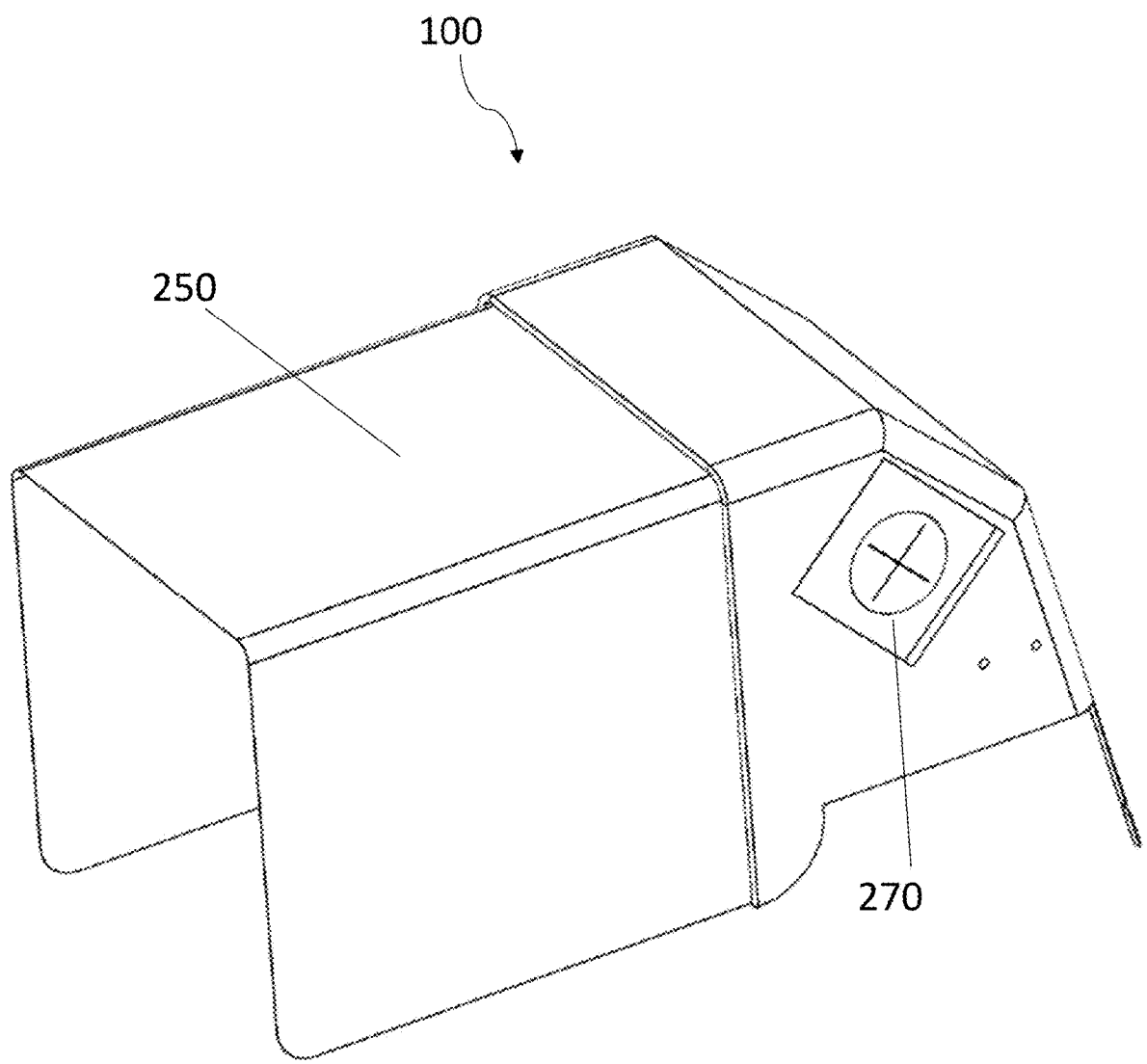
FIG. 39 illustrates a SCONE device in an extended position according to one embodiment of the present invention.
Figure 40:
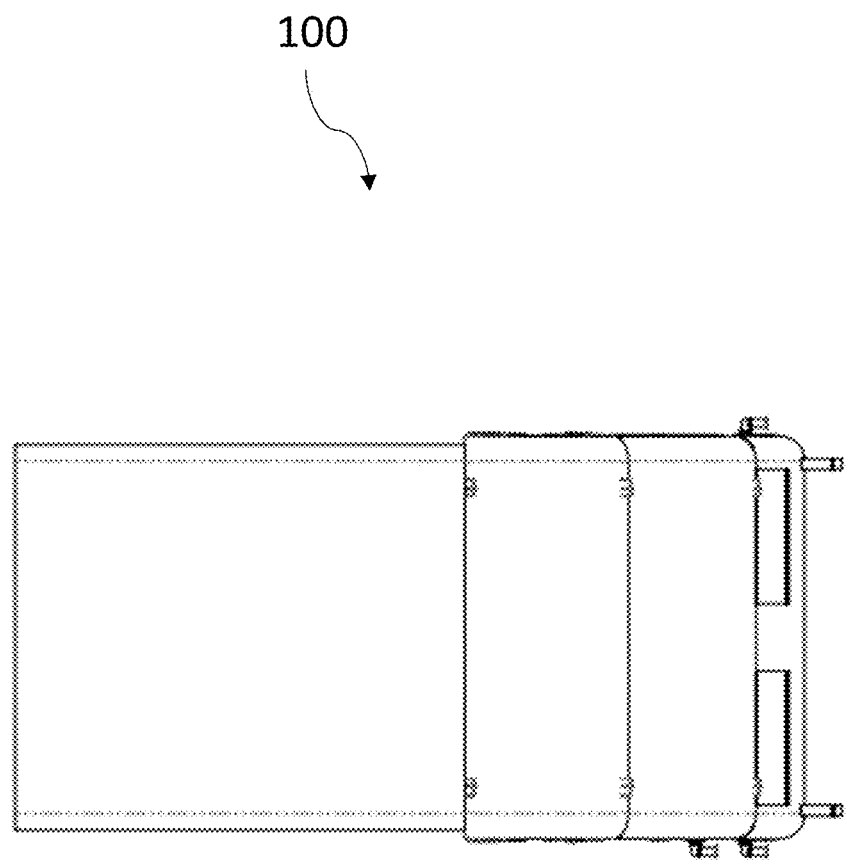
FIG. 40 illustrates a top view of a SCONE device according to one embodiment of the present invention.
Figure 41:
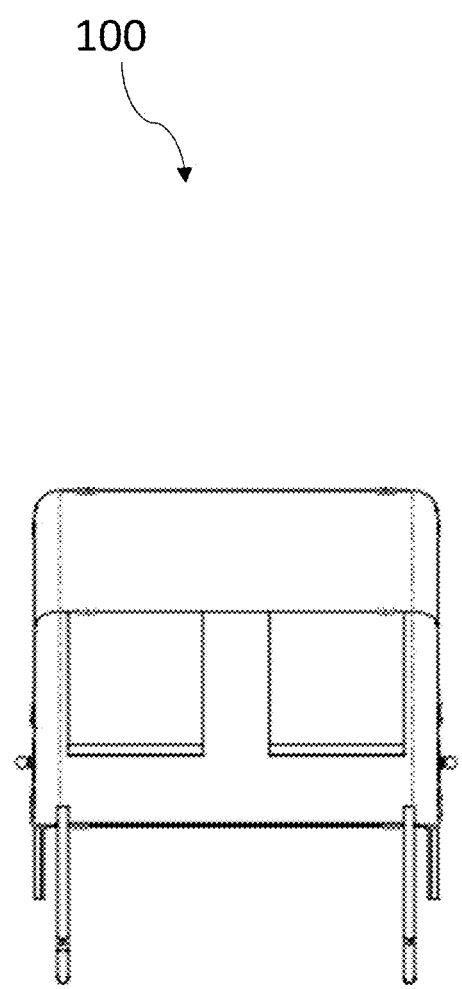
FIG. 41 illustrates a front view of a SCONE device according to one embodiment of the present invention.
Figure 42:
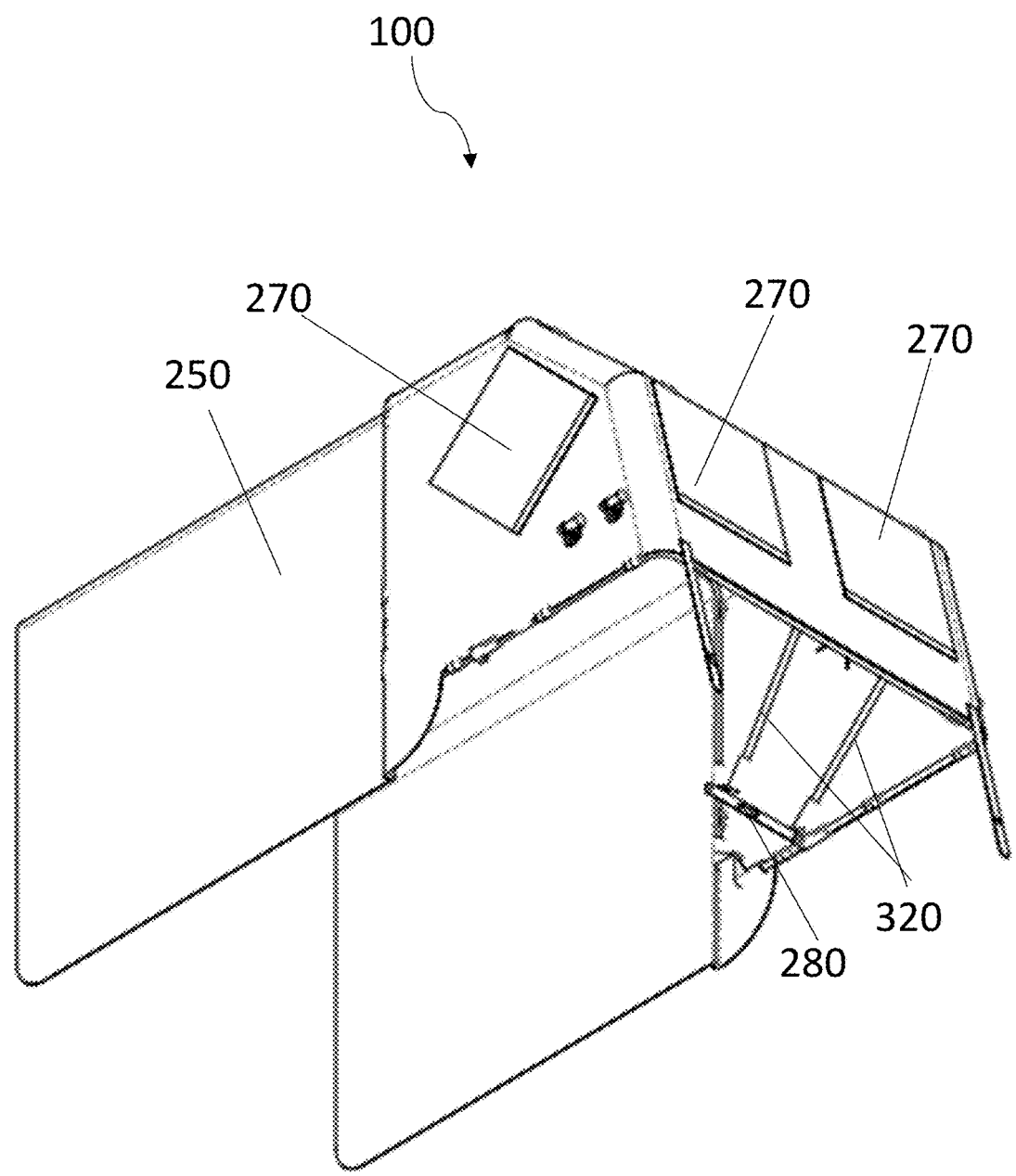
FIG. 42 illustrates a bottom perspective view of a SCONE device according to one embodiment of the present invention.

FIG. 39 illustrates a SCONE device in an extended position according to one embodiment of the present invention In one embodiment, the vinyl cover 250 is operable to cover the SCONE device and to be positioned underneath the patient and the SCONE device to improve the sealing. FIG. 40 illustrates a top view of a SCONE device according to one embodiment of the present invention. FIG. 41 illustrates a front view of a SCONE device according to one embodiment of the present invention. FIG. 42 illustrates a bottom perspective view of a SCONE device according to one embodiment of the present invention.

Figure 43A:
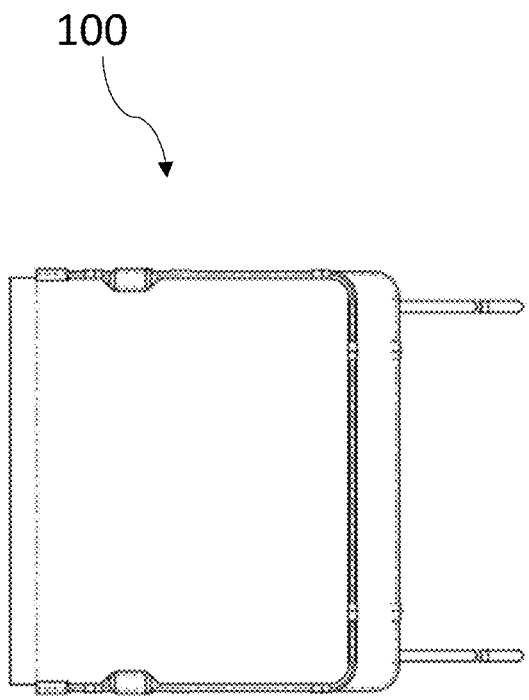
FIG. 43A illustrates a top view of a SCONE device in a collapsed position according to one embodiment of the present invention.
Figure 43B:
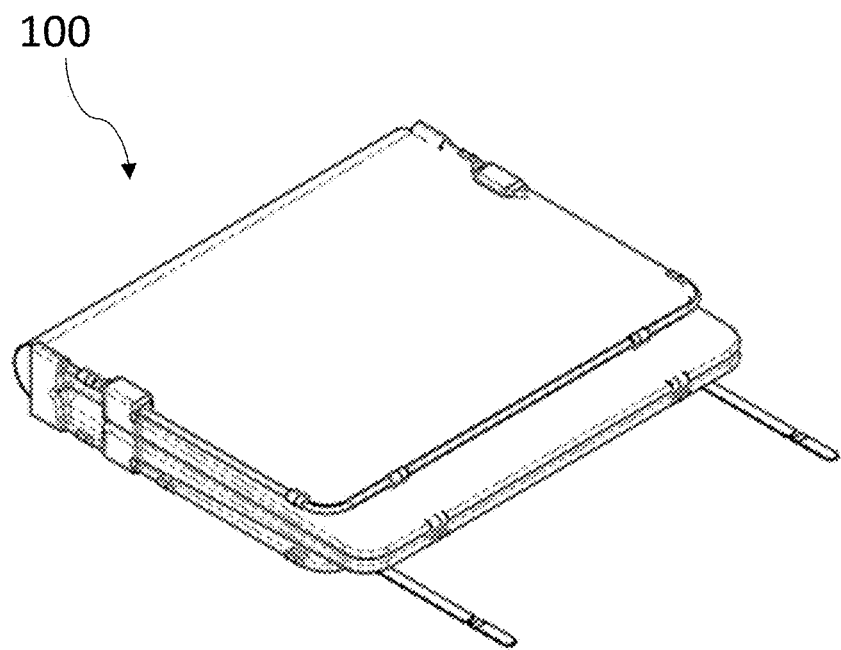
FIG. 43B illustrates a top perspective view of a SCONE device in a collapsed position according to one embodiment of the present invention.
Figure 43C:
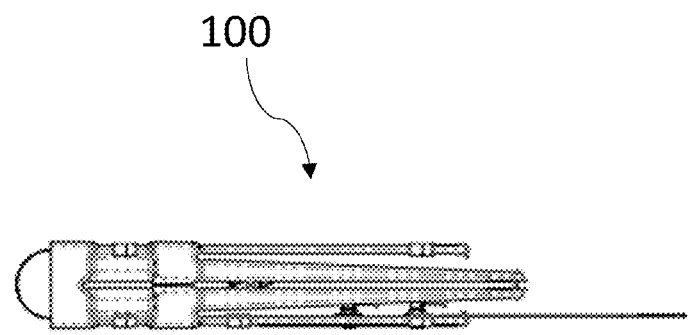
FIG. 43C illustrates a side view of a collapsed SCONE device according to one embodiment of the present invention.
Figure 43D:
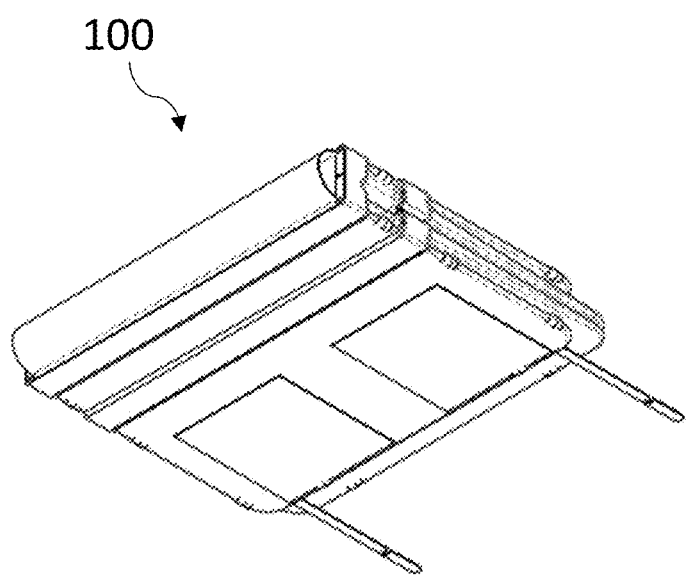
FIG. 43D illustrates a bottom perspective view of a SCONE device in a collapsed position according to one embodiment of the present invention.

FIG. 43A illustrates a top view of a SCONE device in a collapsed position according to one embodiment of the present invention. FIG. 43B illustrates a top perspective view of a SCONE device in a collapsed position according to one embodiment of the present invention. FIG. 43C illustrates a side view of a collapsed SCONE device according to one embodiment of the present invention. FIG. 43D illustrates a bottom perspective view of a SCONE device in a collapsed position according to one embodiment of the present invention.

Example 1: Clearance Efficacy Test—No Open Holes

A SCONE device was tested using a human mannequin torso with a simulated aerosol generating device (AGD) producing particles within the device with sizes ranging from 0.3 to 10 µm. The AGD was capable of producing simulated cough events, increasing the average particle density within the counter from between 1,200-1,500 particles per liter to 30,000-45,000 particles per liter. The number of particles within the device over time were counted using a Fluke Particle Counter. After a simulated cough event, particle density within the device was counted immediately after the cough event and at one-minute intervals afterward until ambient baseline levels were reached.

The test demonstrated a pressure within the device of −0.002-0.0004 inches water. Immediately after the simulated cough event, particle count directly adjacent to, but outside of the box were measured to be at ambient levels and remained at those levels for the full duration of the study. The clearance efficiency within the device was measured to be 99% in less than three minutes, with a complete return to baseline levels within 7 minutes.

Figure 44:
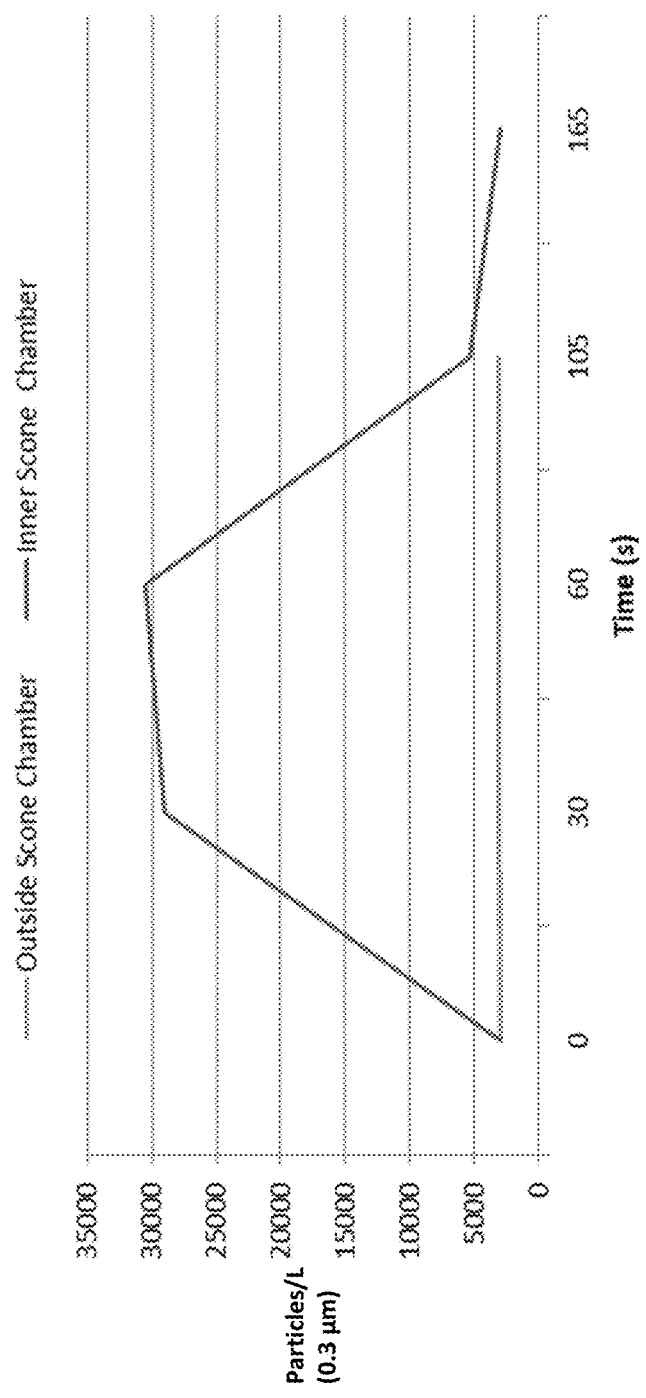
FIG. 44 provides a graph of the efficacy of a barrier protection device having two suction lines on the same side as an oxygen delivery prong.
Figure 45:
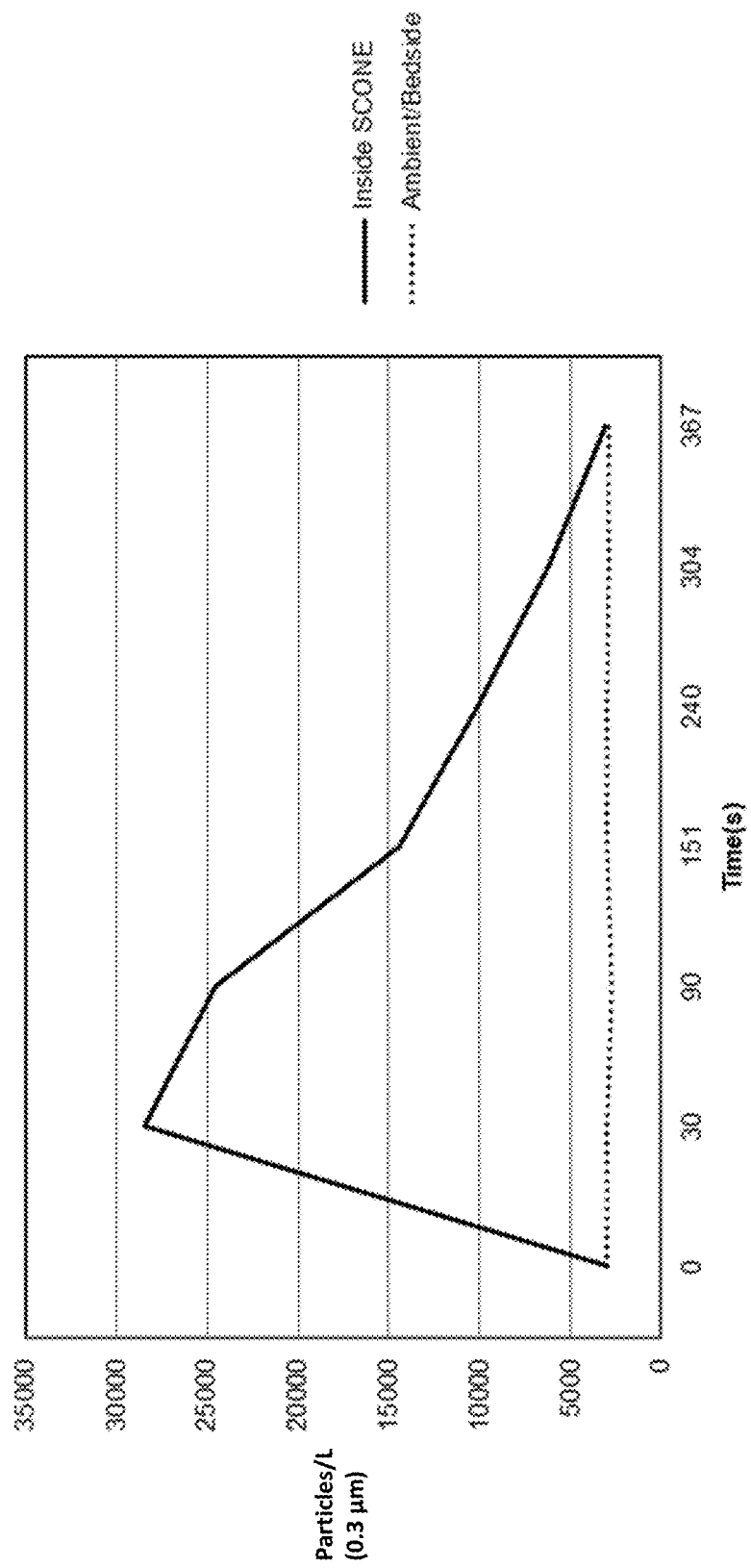
FIG. 45 provides a graph of the efficacy of a barrier protection device having one suction line on a side contralateral to an oxygen delivery prong.
Figure 46:
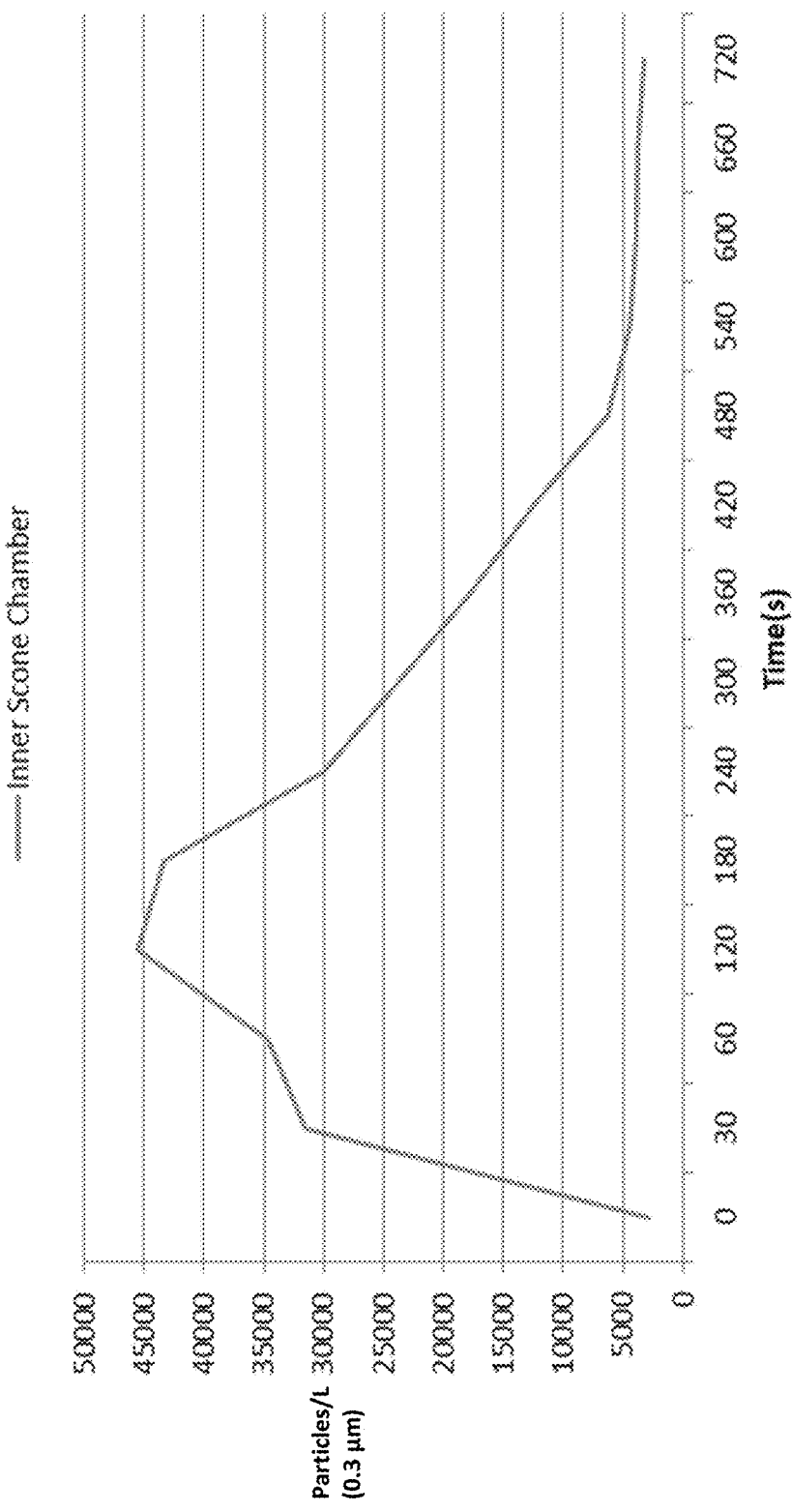
FIG. 46 provides a graph of the efficacy of a barrier protection device having one suction line on the same side as an oxygen delivery prong.

Similar tests were performed in which oxygen was regularly supplied to the interior of a SCONE device. FIG. 44 shows a graph of the number of particles within a SCONE device over time with two suction lines attached on the same side as an oxygen delivery prong. FIG. 45 shows a graph of the number of particles within a SCONE device over time with a single suction line on a side contralateral to an oxygen delivery prong. FIG. 46 shows a graph of the number of particles within a SCONE device over time with a single suction line on the same side as an oxygen delivery prong.

Example 2: Clearance Efficacy Test—Open Holes

SCONE devices having one or more holes open to the outside environment were also tested, in order to simulate the efficacy of the device during interaction by medical professionals. The efficacy of the device with varying numbers of open holes was tested against a negative control group, wherein no SCONE device was present. The background-subtracted equilibrium particle count and percent decrease in number of particles relative to the negative control are shown in Table 2 below.

TABLE 2

Efficacy of SCONE devices having various numbers of open or semi-open holes

| Condition | Total Vacuum Flow Rate [SLPM] | Background-Subtracted Equilibrium Particle Count | Percent-Decrease vs. Negative Control |
|---|---|---|---|
| No SCONE in place (negative control) | 0 | 76,563 particles/cm$^3$ | 0% |
| SCONE with 2 holes open and simulated "arms" in these holes. | 60 | 12,647 particles/cm$^3$ | 83% |
| SCONE with 2 holes fully open. | 60 | 19,907 particles/cm$^3$ | 74% |
| SCONE with 3 holes fully open. | 60 | 33,446 particles/cm$^3$ | 56% |
| SCONE with no holes open; fully sealed. | 60 | 50 particles/cm$^3$ | ~100% |

Example 3: Safety Tests

In order to test the safety of a SCONE device, a volunteer was placed inside the SCONE device for 12 minutes. During the course of the test, the volunteer's oxygen saturation, end-tidal $CO_2$ levels, and inspired minimum $CO_2$ levels were continuously monitored. Normal levels of oxygen saturation were considered to be between 95 and 100%, with results below 90% being considered low. Normal ranges for End-Tidal $CO_2$ were expected to be between 35 and 35 mmHg, while a normal range for inspired minimum $CO_2$ was considered to be 2-20 mmHg. Results of this test, with vital levels being reported every minute for 12 minutes is recorded below in Table 3.

TABLE 3

Oxygen Saturation and $CO_2$ levels of volunteer within SCONE device

| Time (minutes) | SaO$_2$ % | End Tidal CO$_2$/mmHg | IMCO$_2$/mmHg |
|---|---|---|---|
| 0 | 100 | 35 | 4 |
| 1 | 100 | 34 | 4 |
| 2 | 100 | 34 | 3 |
| 3 | 99 | 34 | 3 |
| 4 | 98 | 34 | 4 |
| 5 | 98 | 34 | 4 |
| 6 | 99 | 34 | 4 |
| 7 | 99 | 34 | 4 |
| 8 | 99 | 34 | 4 |
| 9 | 99 | 34 | 4 |
| 10 | 99 | 34 | 4 |
| 11 | 99 | 34 | 4 |
| 12 | 99 | 34 | 4 |

In one embodiment, the present invention is foldable and/or collapsible, thereby increasing the portability sand saving storage space. The SCONE device is adjustable to accommodate for various bed sizes and patient widths. Additionally, the adjustability of the SCONE device allows for a health care professional to adapt the SCONE device to a patient's comfort level. For example, and not limitation, if a patient is claustrophobic, then the SCONE device is operable to increase in width and height to relieve the patient's discomfort. Alternatively, the SCONE device is angled to increase the space around a patient's head and eyes. In one embodiment, the present invention is operable to increase between 10% to 20% in width. In another embodiment, the present invention is operable to increase between 15 to 25% in size. In yet another embodiment, the present invention is operable to increase between 5% to 15% in size.

The SCONE device includes holes in the bottom of the device to allow for affixation to a bed and to support a patient sitting at different angles. In one embodiment, the SCONE device includes at least one hand access port to allow for access to a patient. In another embodiment, the present invention includes four hand access ports. In one embodiment, the SCONE device is disposable. The SCONE device includes a PVC or ethylene vinyl acetate (EVA) film that is used during triage, transportation, and treatment, including aerosol generating procedures (AGPs). In yet another embodiment the present invention is reusable.

The present invention maintains an airtight connection when subjected to a pressure range from between about −8 psi to about atmospheric pressure. The SCONE device is operable to maintain a negative pressure between about −6 to about −3.5 psi. Advantageously, the present invention is operable to function after exposure to 80% isopropyl alcohol and ethanol-based cleaners. Additionally, the present invention is operable to support aerosolized treatments (BIPAP/CPAP and nebulizers).

The present invention is configured to work with a vacuum, medical/oxygen, HEPA filters. However, a HEPA filter is not required for the present invention, which increases the air flow rate. In yet another embodiment, the present invention includes at least two vacuum suction lines that are operable to create a negative-pressure environment and increase the particulate clearance rate. In another embodiment, the present invention is configured to improve visibility for the patient while in the device. For example, and not limitation, the SCONE device includes a clear polycarbonate material that allows for a patient to see out of the SCONE device and for healthcare personnel to see inside the SCONE device.

In another embodiment, the present invention includes at least one sensor. In one embodiment, the at least one sensor includes an air flow rate sensor, a pressure gage, a molecular sensor, a temperature sensor, and/or a moisture sensor. The air flow rate sensor is operable to measure the air exchange rate of the SCONE device. For example, and not limitation, the air flow rate sensor measures the air exchange rate of the SCONE device based on the change in volume and/or density in air going through the SCONE device. The air flow sensor includes a temperature sensor and a heating element. The air flow sensor is operable to determine a temperature difference from the airflow around the heating element and is configured for bidirectional measurement. The change in temperature corresponds to a change in air particulates and the sensor is operable to generate a measurement signal in response to the change in temperature. In yet another embodiment, the present invention is configured to provide a tracer gas. The at least one sensor is operable to monitor the mass air flow rate of the tracer gas to determine the volume of air inside the SCONE device and evaluate if the SCONE device if functioning properly.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A device for removing airborne particulates from an environment, comprising:
    a multiplicity of support members;
    a brace;
    at least two locking hinges;
    a flexible cover including at least one slit; and
    at least one port operable to connect to an air supply or a vacuum;
    wherein the multiplicity of support members include a first pair of substantially parallel support members and a second pair of substantially parallel support members;
    wherein the first pair of substantially parallel support members are connected via a first support crossbar;
    wherein the second pair of substantially parallel support members are connected via a second support crossbar;
    wherein the brace includes a first brace crossbar, a second brace crossbar, a first pair of substantially parallel brace support members and a second pair of substantially parallel brace support members;
    wherein the first brace crossbar is configured to connect the first pair of substantially parallel brace support members;
    wherein the second brace crossbar is configured to connect the second pair of substantially parallel brace support members;
    wherein each locking hinge of the at least two locking hinges is configured to connect to at least one support member of the multiplicity of support members, respectively, and at least one brace support member of either the first pair of substantially parallel brace support members or the second pair of substantially parallel brace support members;
    wherein the flexible cover covers the multiplicity of support members and the brace; and
    wherein the at least one slit provides access to an interior of the device.

2. The device of claim 1, wherein each locking hinge of the at least two locking hinges is further configured to connect to a brace support member of the first pair of substantially parallel brace support members and a brace support member of the second pair of substantially parallel brace support members.

3. The device of claim 1, wherein the device is configured to be positioned in an open position and a closed position, wherein, in the open position, at least one support member of the first pair of substantially parallel support members and at least one support member of the second pair of substantially parallel support members are substantially orthogonal, wherein the at least two substantially orthogonal support members are connected via at least one barb fitting.

4. The device of claim 1, wherein the flexible cover includes polyvinyl chloride.

5. The device of claim 1, wherein the at least one slit includes four slits.

6. The device of claim 1, further including at least one attachment component, wherein the at least one attachment component is connected to the second support crossbar, wherein the at least one attachment component is operable to attach the device to a hospital bed or a stretcher.

7. The device of claim 1, wherein the at least one port includes two ports.

8. The device of claim 1, further including at least one cover attachment component, wherein the at least one cover attachment component includes at least one female snap fastener, wherein the at least one female snap fastener is operable to receive a male snap fastener, and wherein the flexible cover includes the male snap fastener.

9. The device of claim 1, wherein the first pair of substantially parallel support members includes a first support member and a second support member, wherein the second pair of substantially parallel support members includes a third support member and a fourth support member, wherein the first support member and the third support member are on a first side of the device, wherein the second support member and the fourth support member are on a second side of the device, wherein the first support member and the third support member are substantially orthogonal, wherein the second support member and the fourth support member are substantially orthogonal.

10. The device of claim 1, wherein the first pair of substantially parallel brace support members are substantially parallel to the second pair of substantially parallel brace support members.

11. The device of claim 1, wherein the device is operable to create a negative pressure environment when connected to the vacuum.

12. A device for removing airborne particulates from an environment, comprising:
    a multiplicity of support members;
    a brace;
    at least two locking hinges;
    a flexible cover including at least one slit;
    at least one port operable to connect to an air supply or a vacuum; and
    at least one tube including a first end and a second end;
    wherein the multiplicity of support members include a first pair of substantially parallel support members and a second pair of substantially parallel support members;
    wherein the first pair of substantially parallel support members are connected via a first support crossbar;
    wherein the second pair of substantially parallel support members are connected via a second support crossbar;
    wherein the brace includes a first brace crossbar, a second brace crossbar, a first pair of substantially parallel brace support members and a second pair of substantially parallel brace support members;

wherein the first brace crossbar is configured to connect each brace support member of the first pair of substantially parallel brace support members;

wherein the second brace crossbar is configured to connect each brace support member of the second pair of substantially parallel brace support members;

wherein each of the at least two locking hinges is configured to connect to at least one support member of the multiplicity of support members, respectively, and at least one brace support member of either the first pair of substantially parallel brace support members or the second pair of substantially parallel brace support members;

wherein the flexible cover covers the multiplicity of support members and the brace;

wherein the slit provides access to an interior of the device;

wherein the first end of the at least one tube is connected to the at least one port;

wherein the second end of the at least one tube is connected to the air supply or the vacuum; and wherein the device is operable to create a negative pressure environment when connected to the vacuum.

13. The device of claim 12, wherein each of the at least two locking hinges is further configured to connect to a brace support member of the first pair of substantially parallel brace support members and a brace support member of the second pair of substantially parallel brace support members.

14. The device of claim 12, further configured to be positioned in an open position and a closed position, wherein, in the open position, at least one support member of the first pair of substantially parallel support members and at least one support member of the second pair of substantially parallel support members are substantially orthogonal, wherein the at least two substantially orthogonal support members are connected via at least one barb fitting.

15. The device of claim 12, further including at least one High Efficiency Particulate Air (HEPA) filter connected to the at least one port.

16. The device of claim 12, wherein the at least one slit includes four slits.

17. The device of claim 12, wherein the flexible cover includes polyvinyl chloride.

18. The device of claim 12 further including at least one attachment component, wherein the at least one attachment component is attached to the second support crossbar, and wherein the at least one attachment component is operable to attach the device to a hospital bed or a stretcher.

19. The device of claim 12, wherein the at least one port includes two ports.

20. The device of claim 12, further including at least one cover attachment component, wherein the at least one cover attachment component includes at least one female snap fastener, wherein the at least one female snap fastener is operable to receive a male snap fastener, wherein the flexible cover includes the male snap fastener.

21. A device for removing airborne particulates from an environment, comprising:
a multiplicity of support members;
at least two locking hinges;
a flexible cover including at least one slit;
at least one port operable to connect to an air supply or a vacuum; and
at least one barb fitting;
wherein the multiplicity of support members includes a first pair of substantially parallel support members and a second pair of substantially parallel support members;
wherein each of the at least two locking hinges is configured to connect to at least one support member of the first pair of substantially parallel support members and at least one support member of the second pair of substantially parallel support members;
wherein the first pair of substantially parallel support members are connected via a first support crossbar;
wherein the second pair of substantially parallel support members are connected via a second support crossbar;
wherein the at least one barb fitting is configured to connect to the at least one support member of the first pair of substantially parallel support members and the at least one support member of the second pair of substantially parallel support members;
wherein the flexible cover covers the multiplicity of support members;
wherein the at least one slit provides access to an interior of the device;
wherein the device is configured to be positioned in an open position and a closed position;
wherein, in the open position, the first pair of substantially parallel support members are substantially orthogonal to the second pair of substantially parallel support members; and
wherein the device is operable to create a negative pressure environment when connected to the vacuum.

22. The device of claim 21, further including at least one attachment component, wherein the at least one attachment component is attached to the second support crossbar, and wherein the at least one attachment component is operable to attach the device to a hospital bed or a stretcher.

23. The device of claim 21, further including at least one cover attachment component, wherein the at least one cover attachment component includes at least one female snap fastener, wherein the at least one female snap fastener is operable to receive a male snap fastener, wherein the flexible cover includes the male snap fastener.

24. A device for removing airborne particulates from an environment, comprising:
a multiplicity of support members;
at least two locking hinges;
a flexible cover including at least one slit;
at least one port operable to connect to an air supply or a vacuum;
at least one barb fitting;
and an attachment component;
wherein the multiplicity of support members include a first pair of substantially parallel support members and a second pair of substantially parallel support members;
wherein the first pair of substantially parallel support members are connected via a first support crossbar;
wherein the second pair of substantially parallel support members are connected via a second support crossbar;
wherein each of the at least two locking hinges are configured to connect to at least one support member of the first pair of substantially parallel support members and at least one support member of the second pair of substantially parallel support members;
wherein the at least one barb fitting is configured to connect to the at least one support member of the first pair of substantially parallel support members and the at least one support member of the second pair of substantially parallel support members;

wherein the flexible cover covers the multiplicity of support members;

wherein the at least one slit provides access to an interior of the device;

wherein the attachment component is operable to attach the device to a hospital bed or a stretcher; and wherein the device is operable to create a negative pressure environment when connected to the vacuum;

wherein the device is configured to be positioned in an open position and a closed position, wherein, in the open position, the at least one support member of the first pair of substantially parallel support members and the at least one support member of the second pair of substantially parallel support members are substantially orthogonal, wherein the at least two substantially orthogonal support members are connected via the at least one barb fitting.

25. The device of claim 24, further including a brace, wherein the brace includes a first brace crossbar, a second brace crossbar, a first pair of substantially parallel brace support members and a second pair of substantially parallel brace support members, wherein the first brace crossbar is configured to connect to each brace support member of the first pair of substantially parallel brace support members, and wherein the second brace crossbar is configured to connect to each brace support member of the second pair of substantially parallel brace support members.

26. The device of claim 25, wherein the at least two locking hinges are further configured to connect at least one brace support member and at least one support member of the multiplicity of support members.

27. The device of claim 24, wherein the at least one slit includes four slits.

28. The device of claim 24, further including at least one cover attachment component, wherein the at least one cover attachment component includes at least one female snap fastener, wherein the at least one female snap fastener is operable to receive a male snap fastener, wherein the flexible cover includes a male snap fastener.

* * * * *